Figure 1:
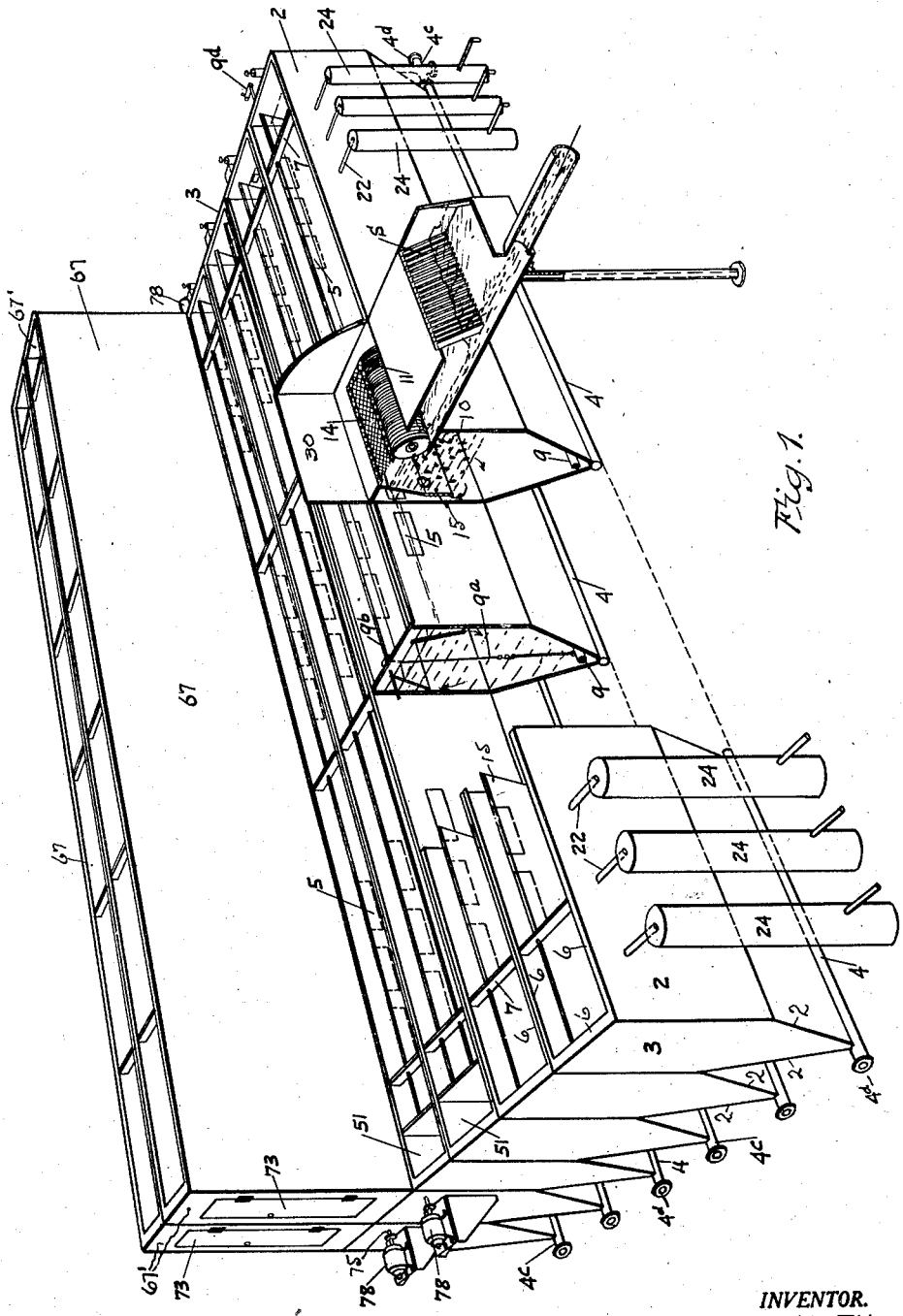

Dec. 31, 1940.  C. G. HAWLEY  2,226,532
SYSTEM OF WATER PURIFICATION AND WASTE RECOVERY
Filed March 24, 1936   24 Sheets-Sheet 1

INVENTOR.
CHARLES G. HAWLEY
BY Busser & Harding
ATTORNEYS.

Dec. 31, 1940.  C. G. HAWLEY  2,226,532
SYSTEM OF WATER PURIFICATION AND WASTE RECOVERY
Filed March 24, 1936  24 Sheets-Sheet 2

INVENTOR.
CHARLES G. HAWLEY
BY
ATTORNEYS

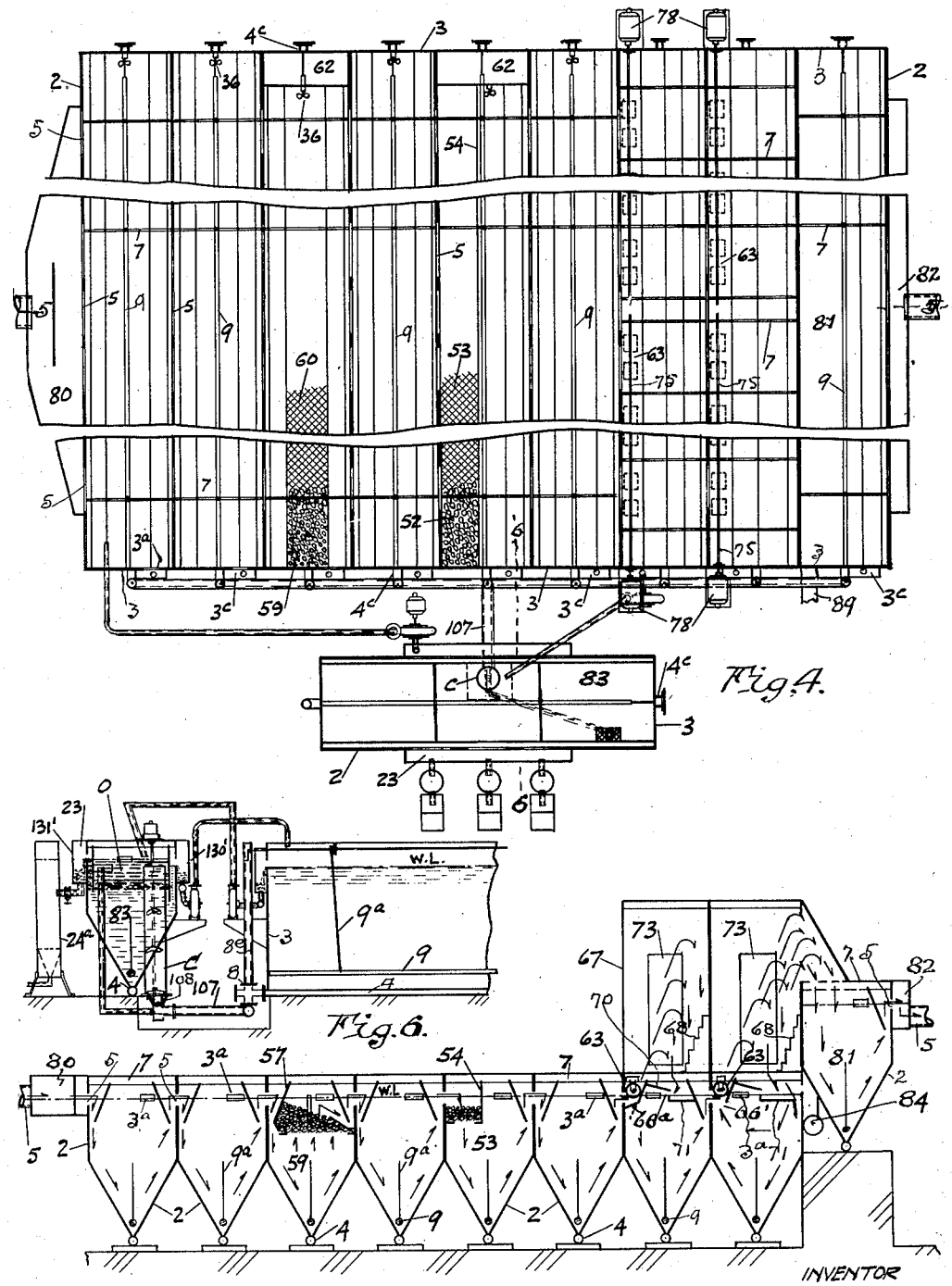

Dec. 31, 1940.     C. G. HAWLEY     2,226,532
SYSTEM OF WATER PURIFICATION AND WASTE RECOVERY
Filed March 24, 1936     24 Sheets-Sheet 4
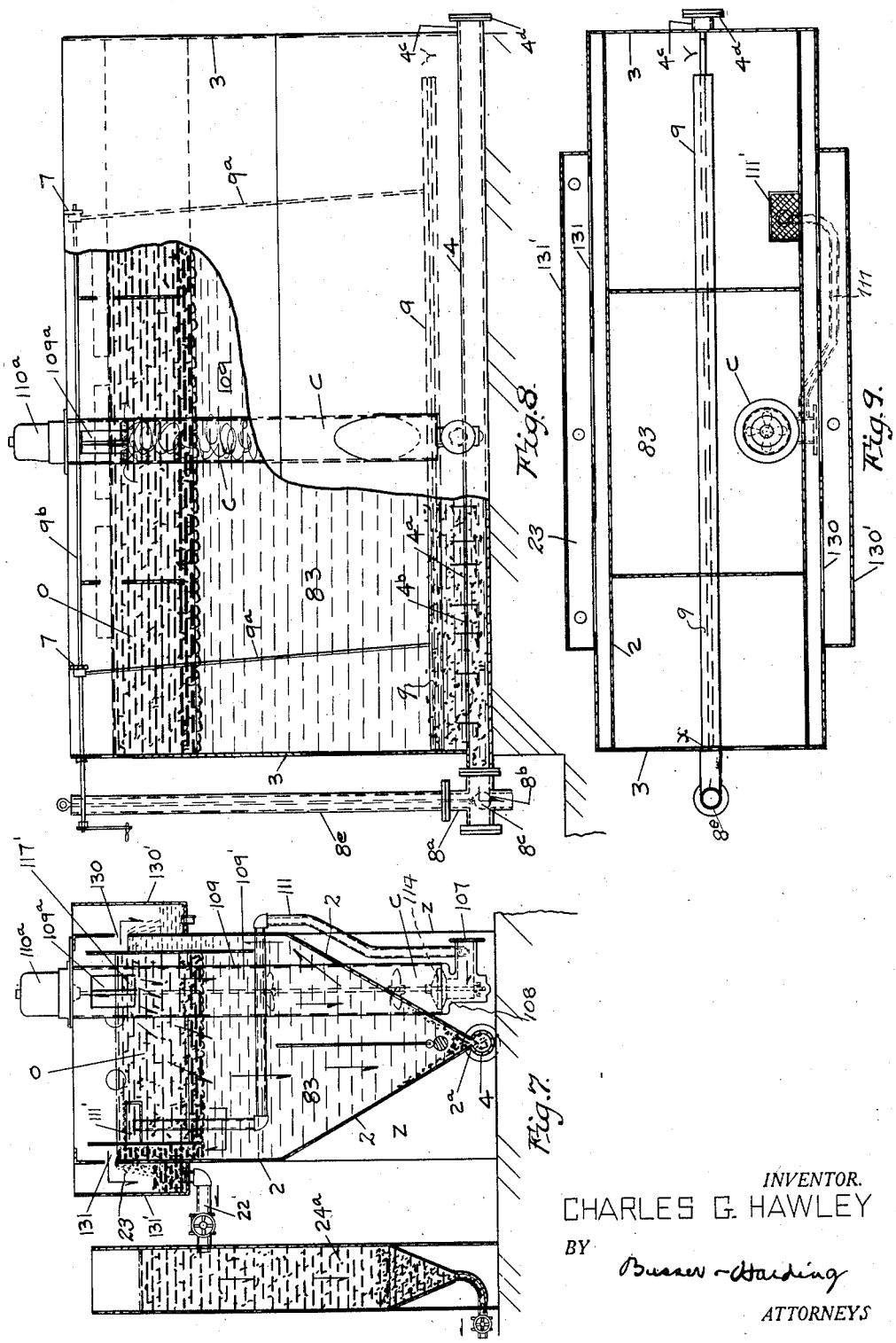
INVENTOR.
CHARLES G. HAWLEY
BY
ATTORNEYS Dec. 31, 1940.   C. G. HAWLEY   2,226,532
SYSTEM OF WATER PURIFICATION AND WASTE RECOVERY
Filed March 24, 1936   24 Sheets-Sheet 5
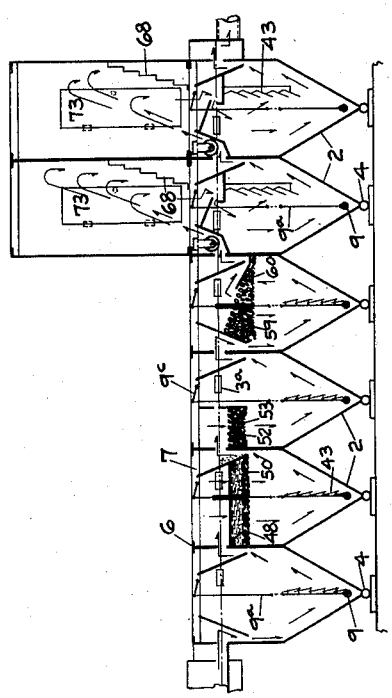
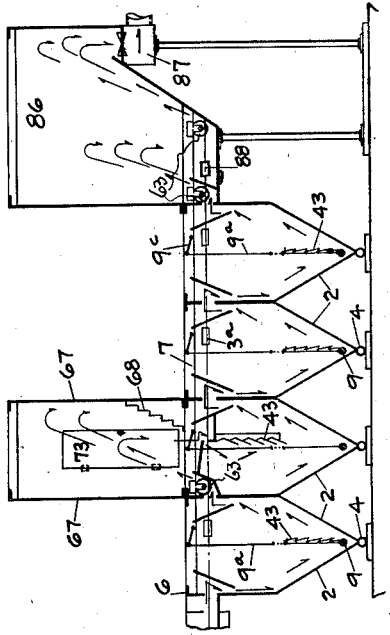
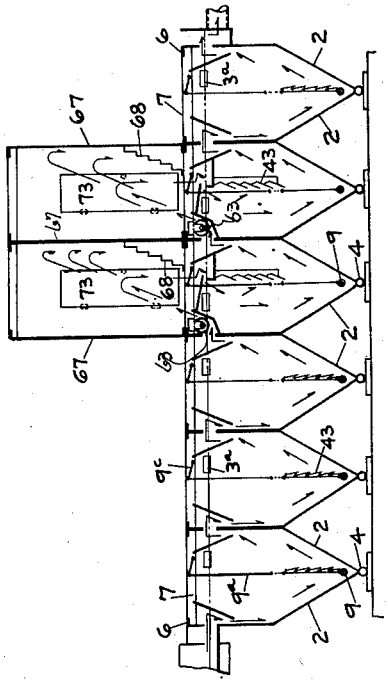
INVENTOR.
CHARLES G. HAWLEY
BY
ATTORNEYS

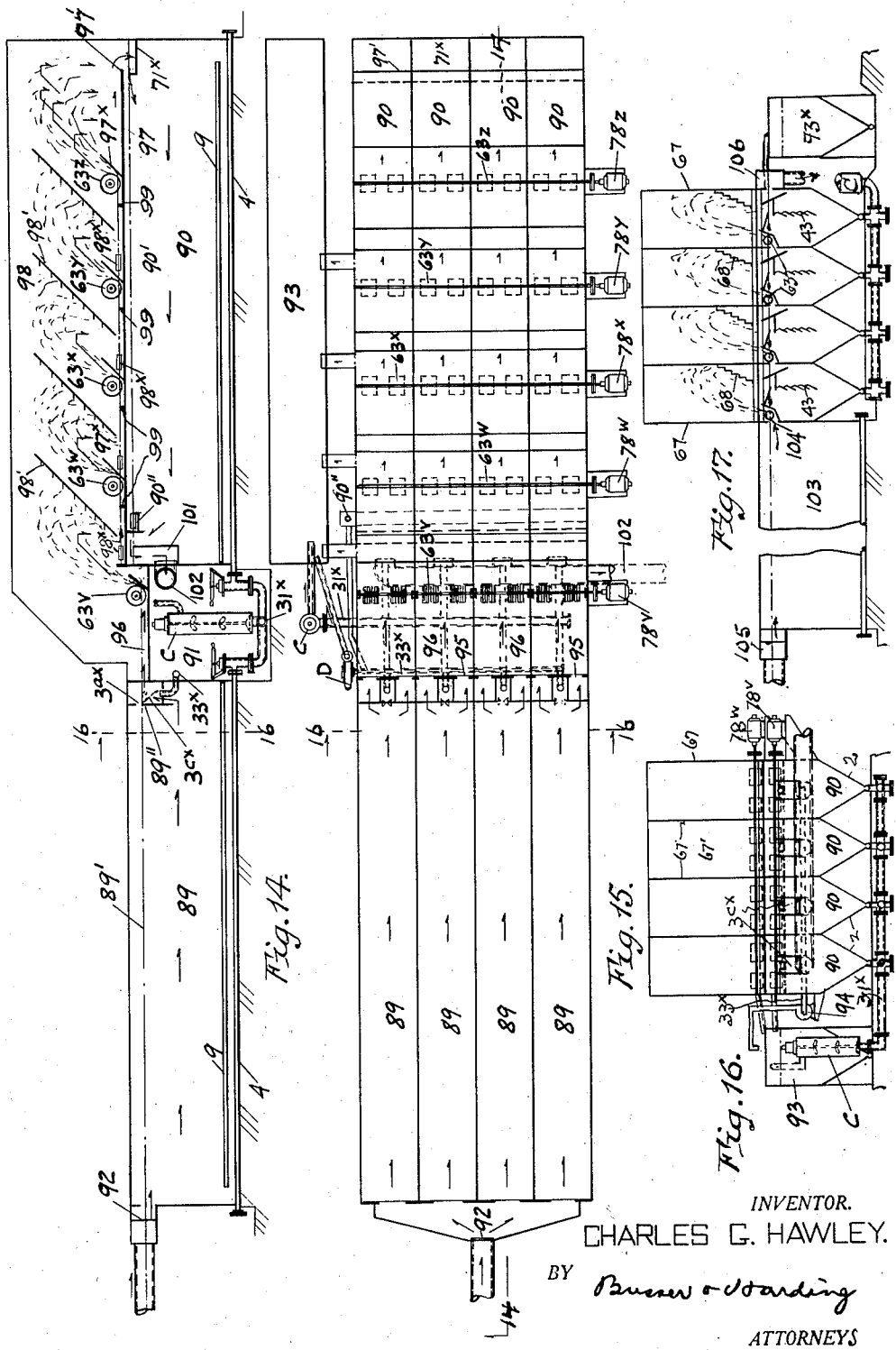

Dec. 31, 1940.  C. G. HAWLEY  2,226,532
SYSTEM OF WATER PURIFICATION AND WASTE RECOVERY
Filed March 24, 1936  24 Sheets-Sheet 7
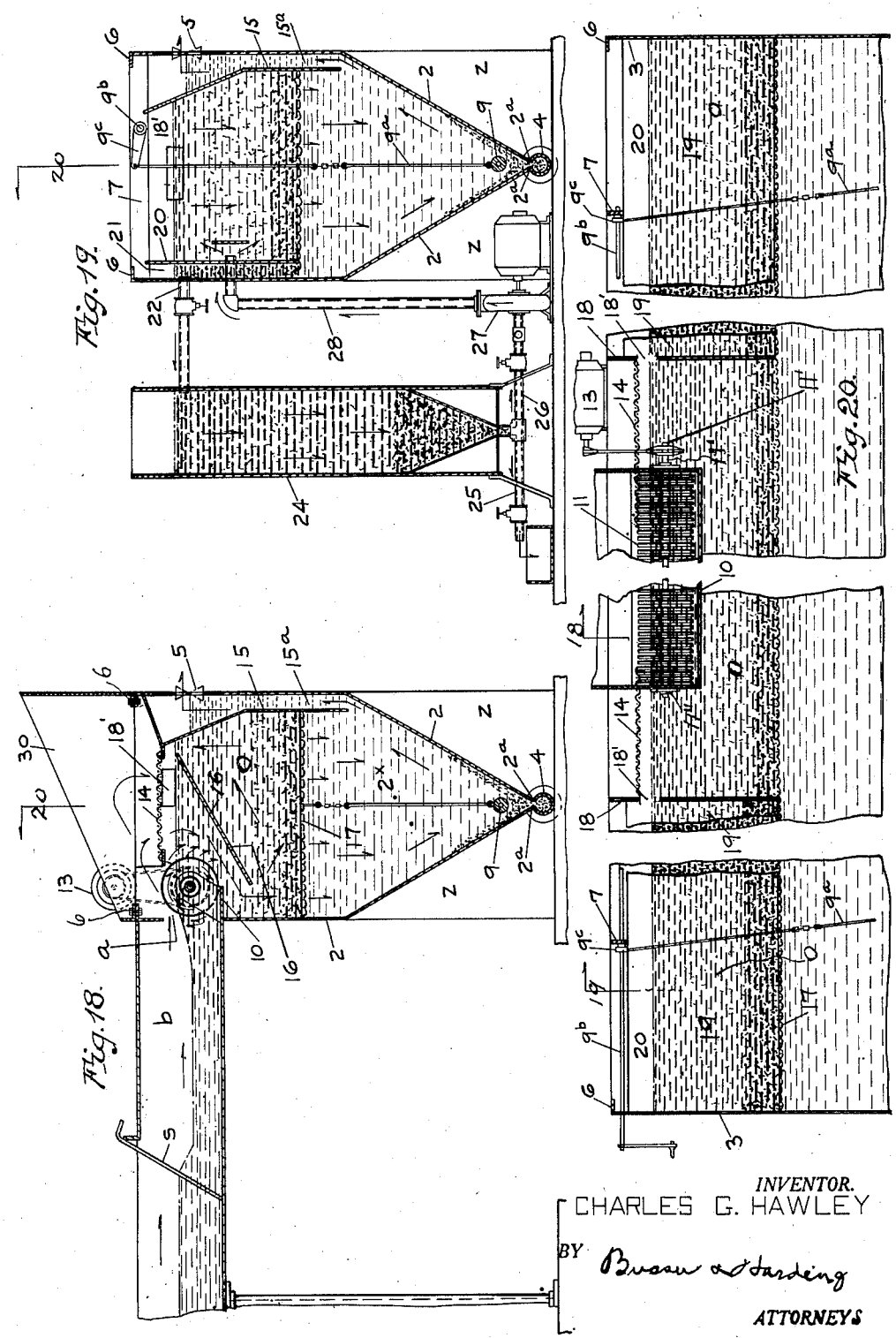
INVENTOR.
CHARLES G. HAWLEY
BY
ATTORNEYS Dec. 31, 1940.                C. G. HAWLEY                    2,226,532
         SYSTEM OF WATER PURIFICATION AND WASTE RECOVERY
                  Filed March 24, 1936          24 Sheets-Sheet 8
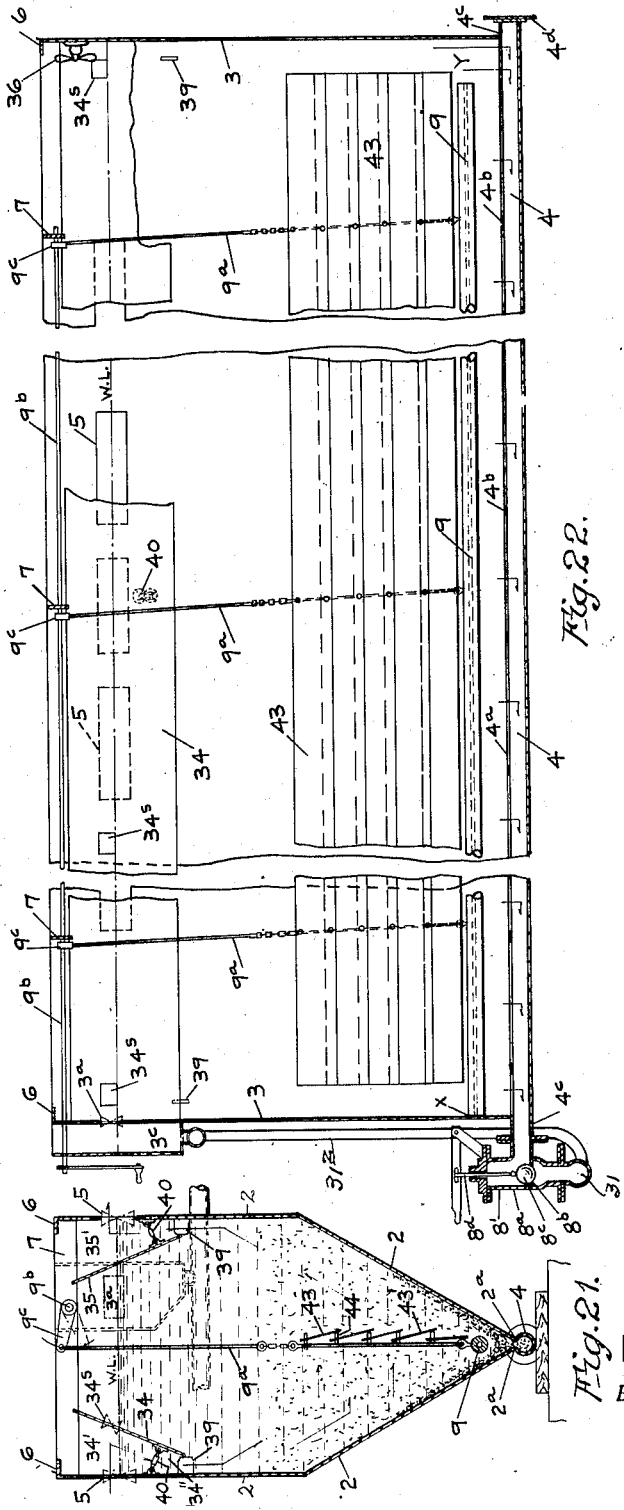
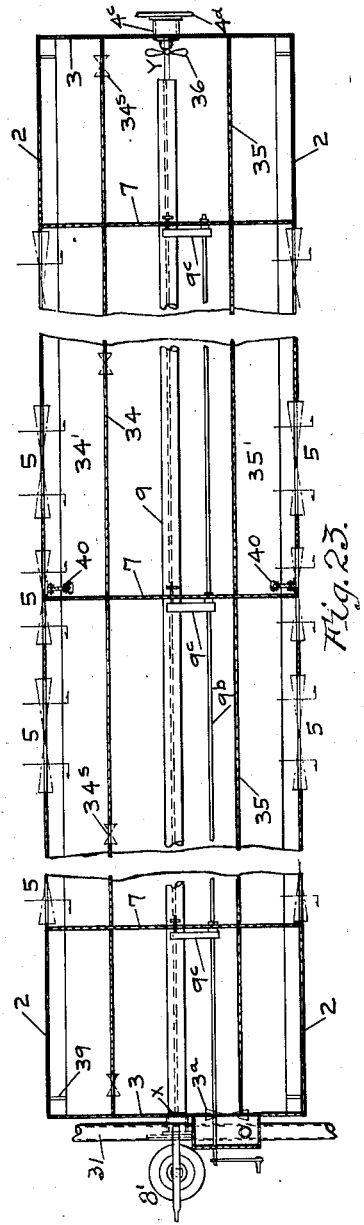
INVENTOR.
CHARLES G. HAWLEY
BY
          ATTORNEYS

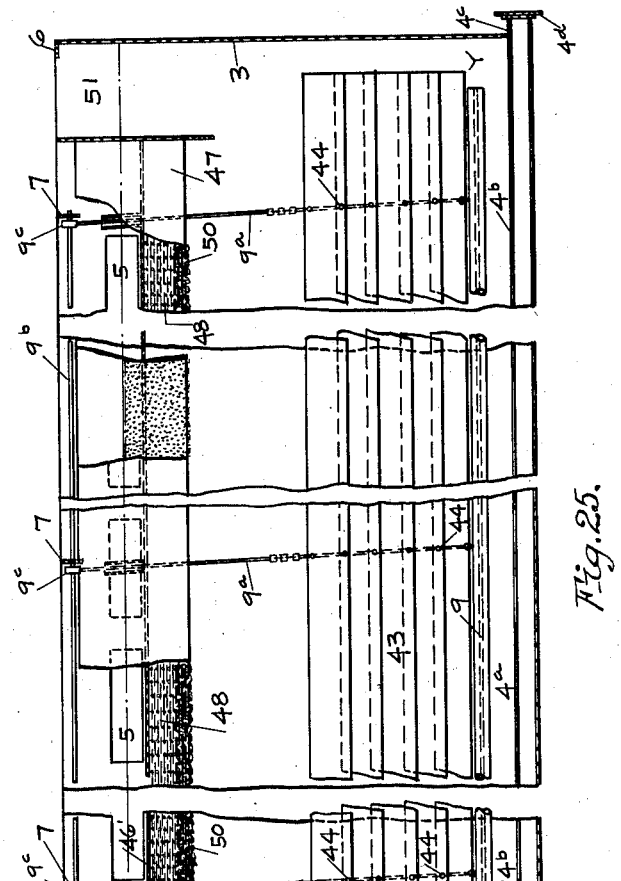

Dec. 31, 1940. C. G. HAWLEY 2,226,532
SYSTEM OF WATER PURIFICATION AND WASTE RECOVERY
Filed March 24, 1936 24 Sheets-Sheet 10
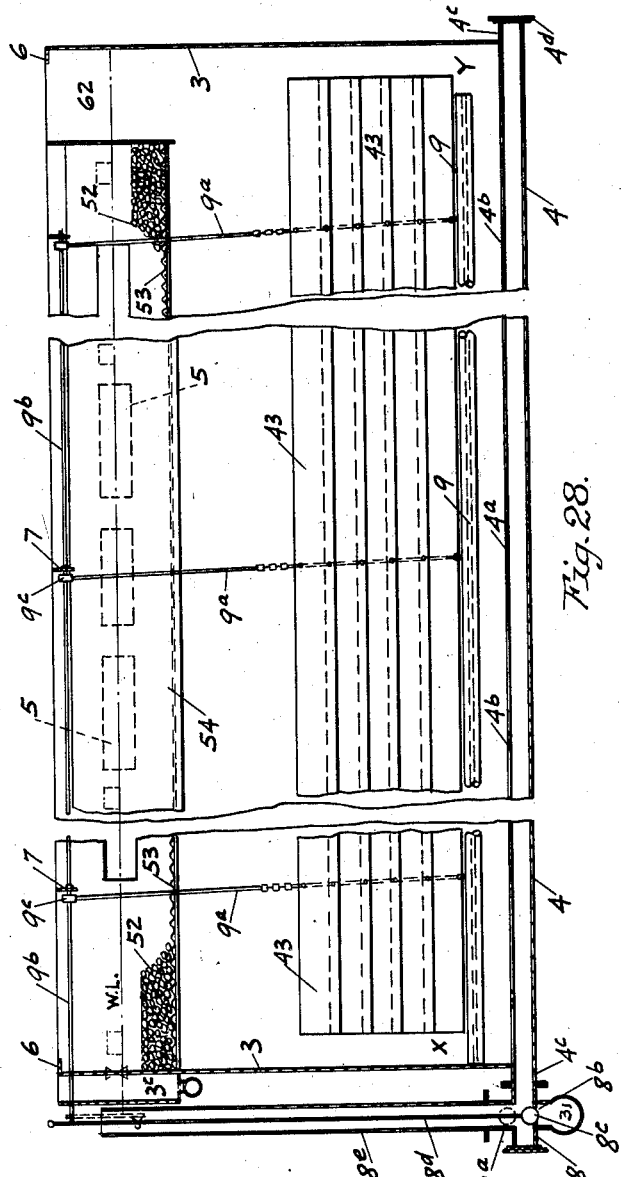
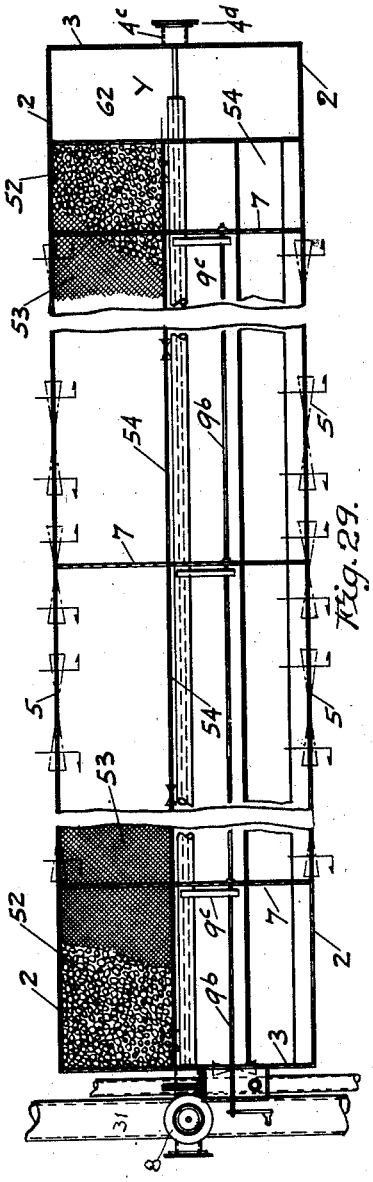
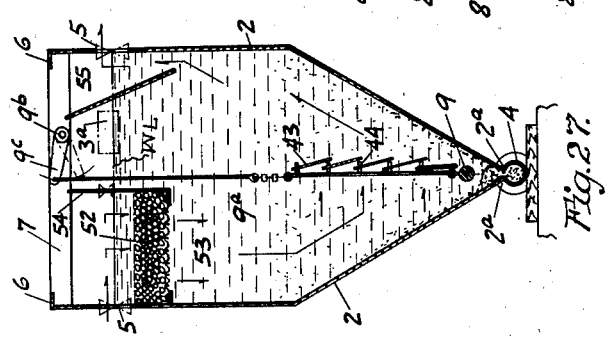
INVENTOR.
CHARLES G. HAWLEY
BY
ATTORNEYS Dec. 31, 1940.  C. G. HAWLEY  2,226,532
SYSTEM OF WATER PURIFICATION AND WASTE RECOVERY
Filed March 24, 1936  24 Sheets-Sheet 11
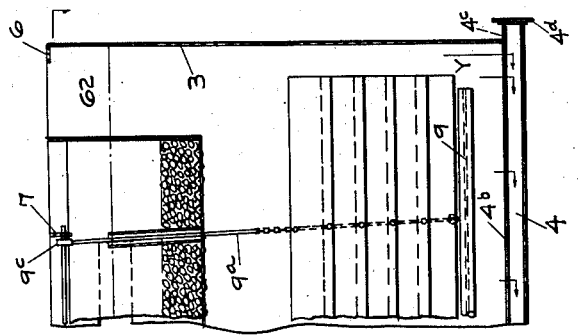
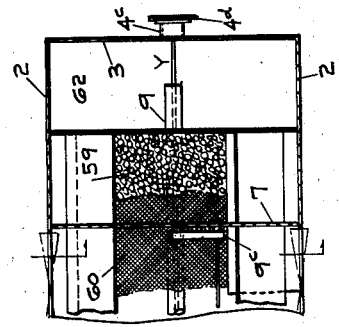
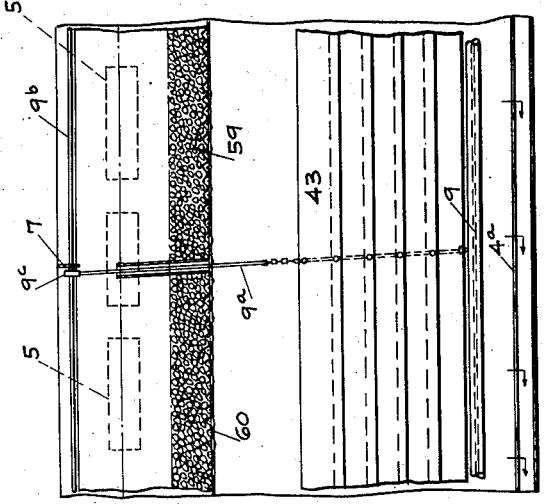
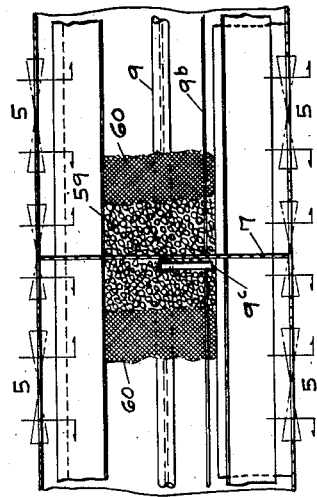
Fig. 31.
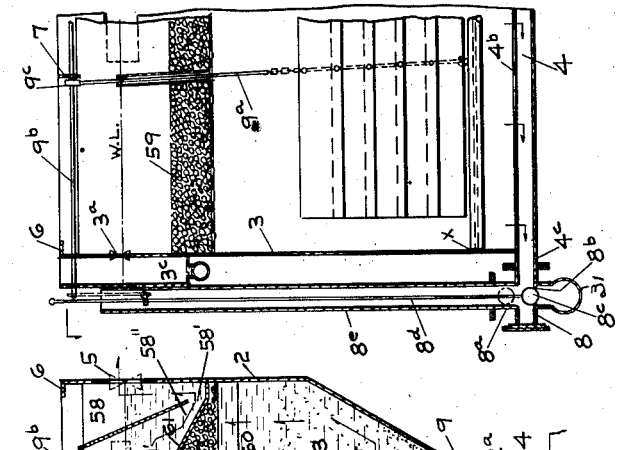
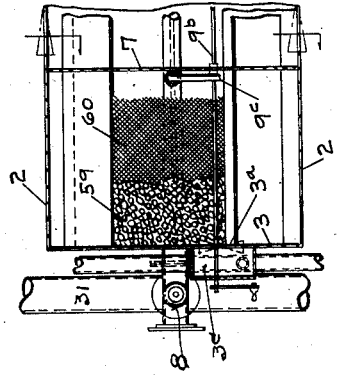
Fig. 32.
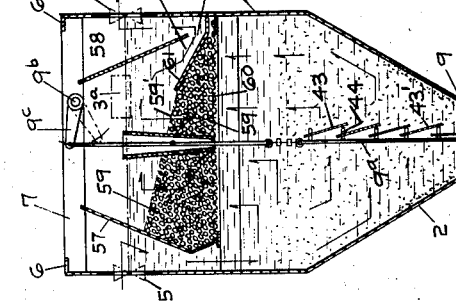
Fig. 30.
INVENTOR.
CHARLES G. HAWLEY
BY Busser & Harding
ATTORNEYS Dec. 31, 1940. C. G. HAWLEY 2,226,532
SYSTEM OF WATER PURIFICATION AND WASTE RECOVERY
Filed March 24, 1936 24 Sheets-Sheet 12
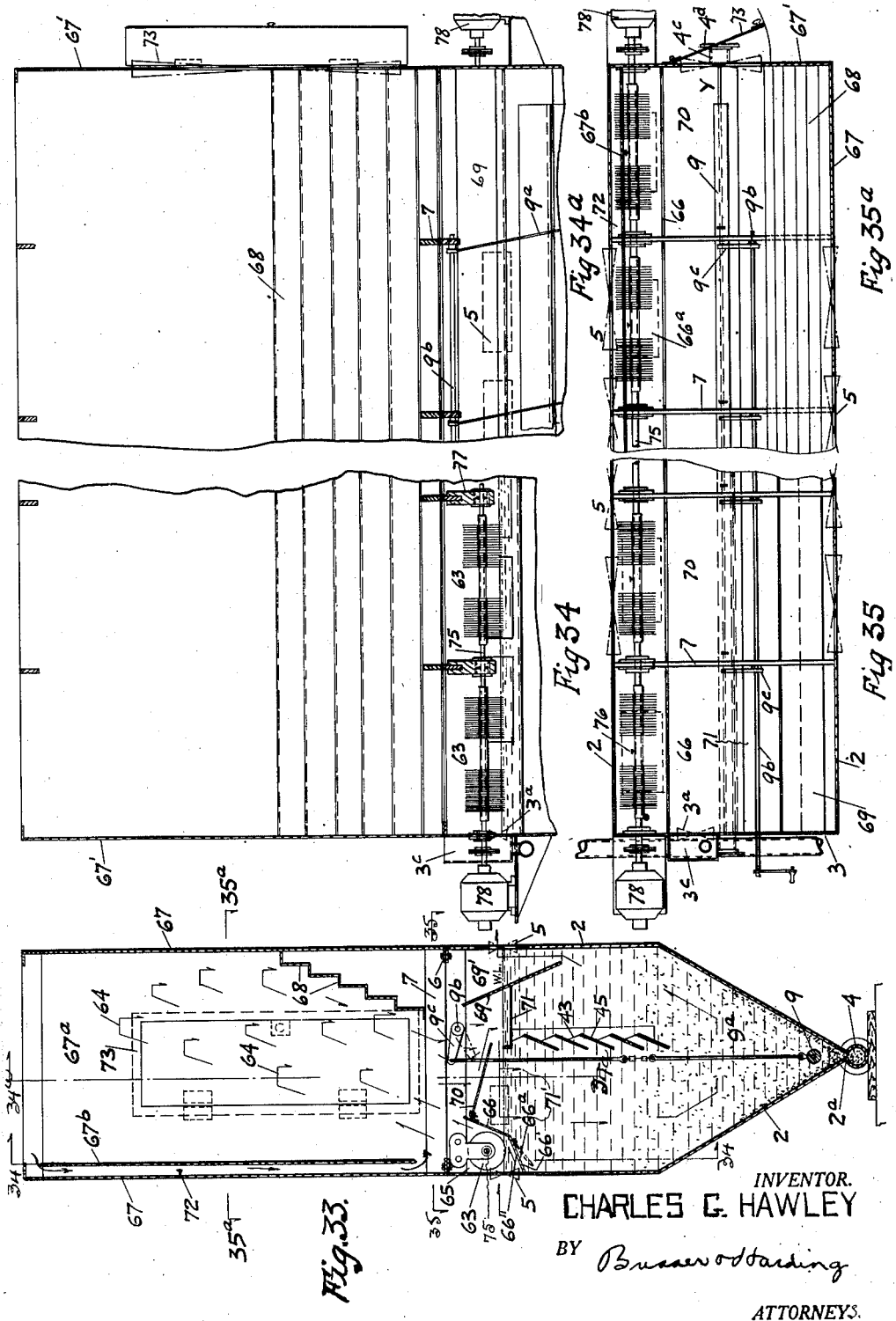
INVENTOR.
CHARLES G. HAWLEY
BY
ATTORNEYS.

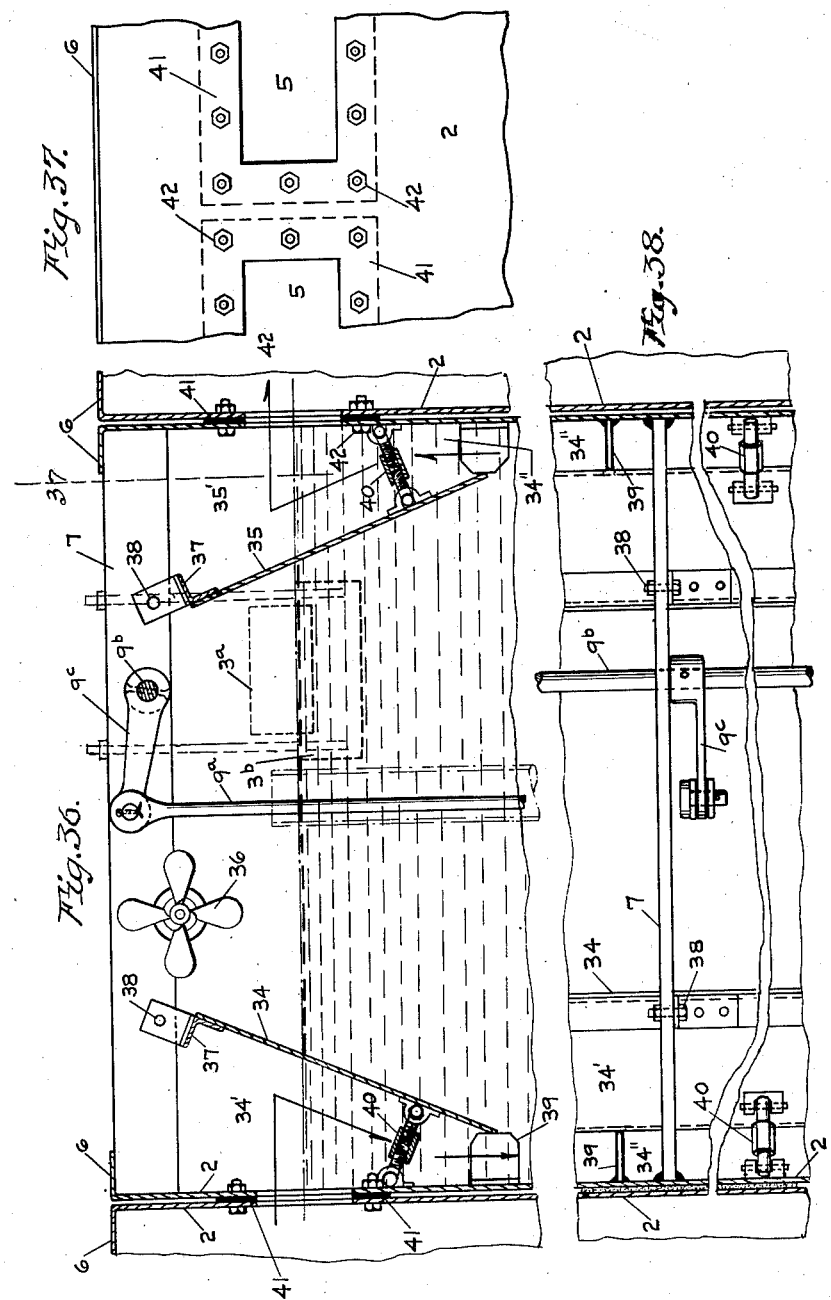

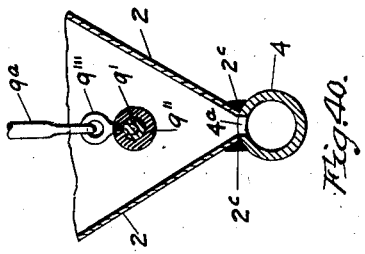
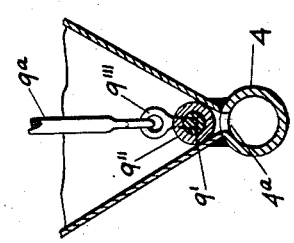
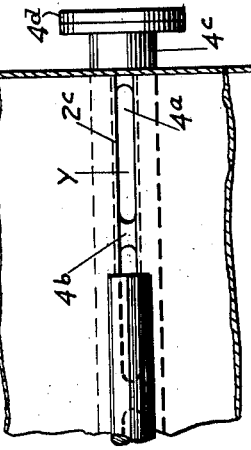
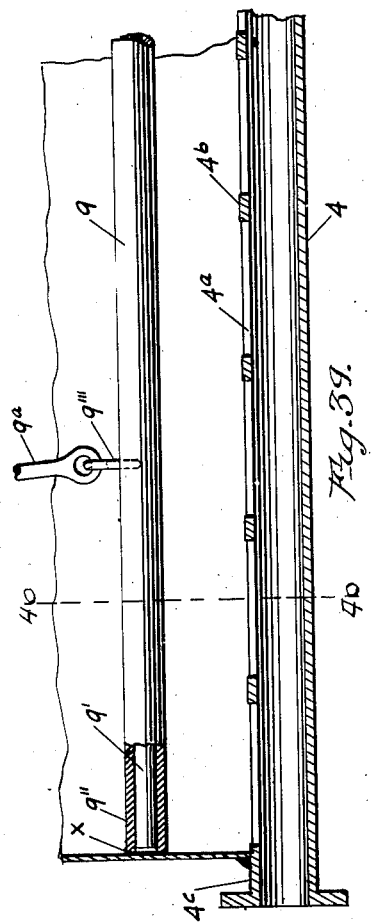
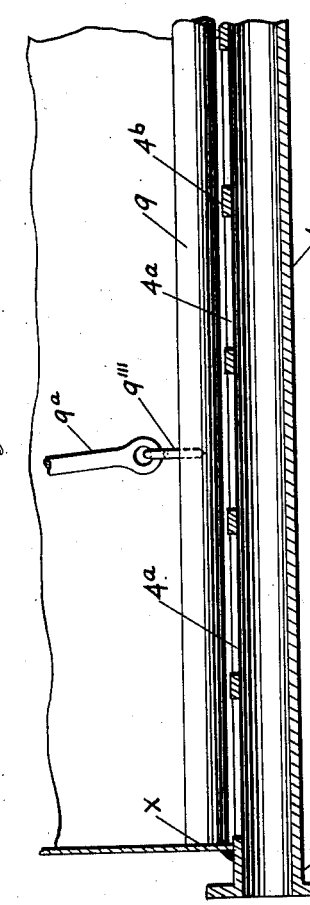
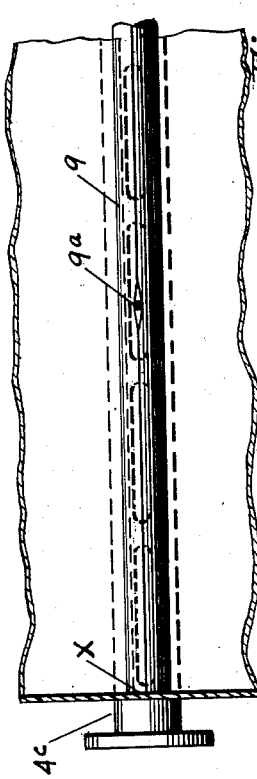
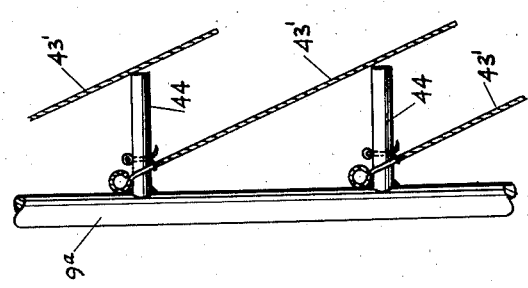

Dec. 31, 1940.  C. G. HAWLEY  2,226,532
SYSTEM OF WATER PURIFICATION AND WASTE RECOVERY
Filed March 24, 1936  24 Sheets-Sheet 15
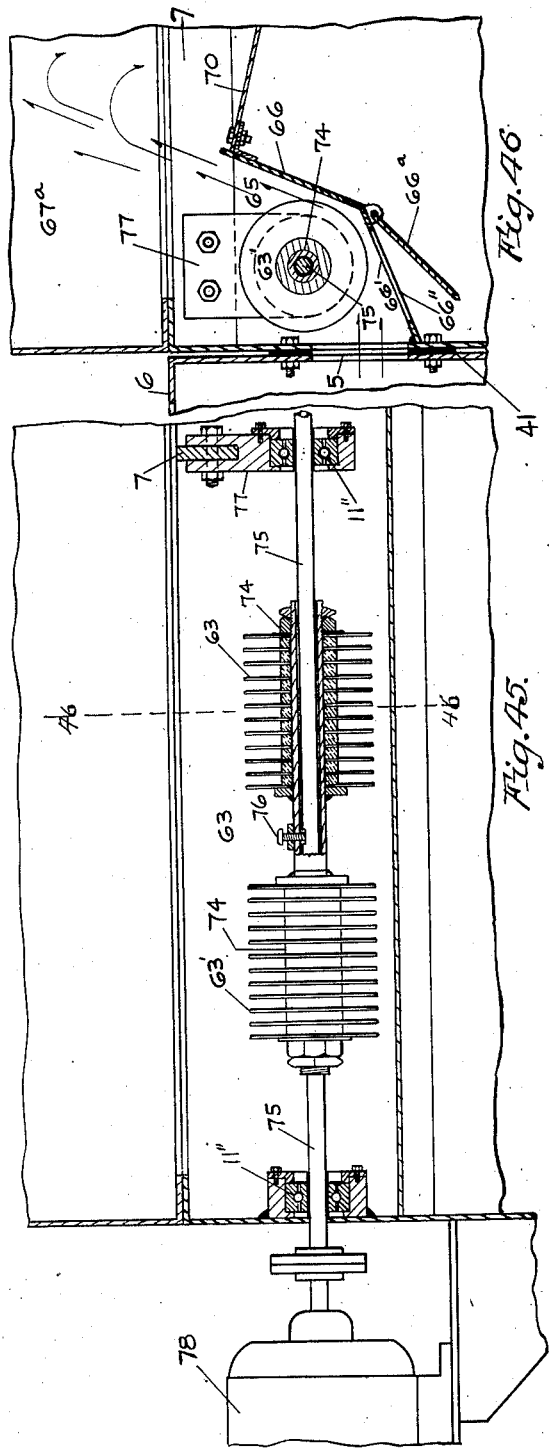
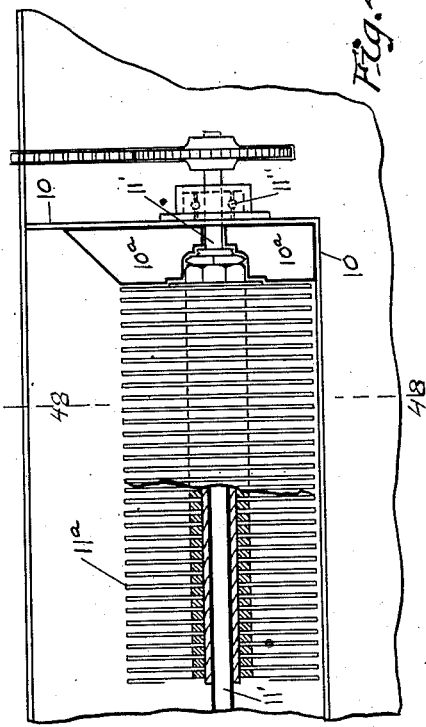
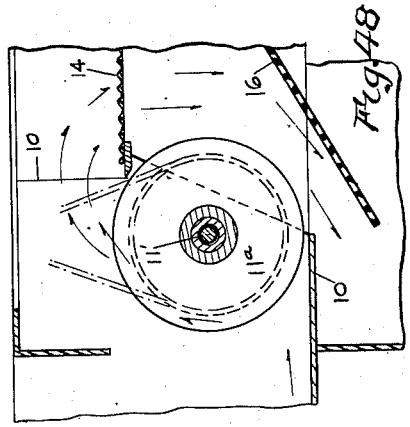
INVENTOR.
CHARLES G. HAWLEY.
BY Busser & Harding
ATTORNEYS

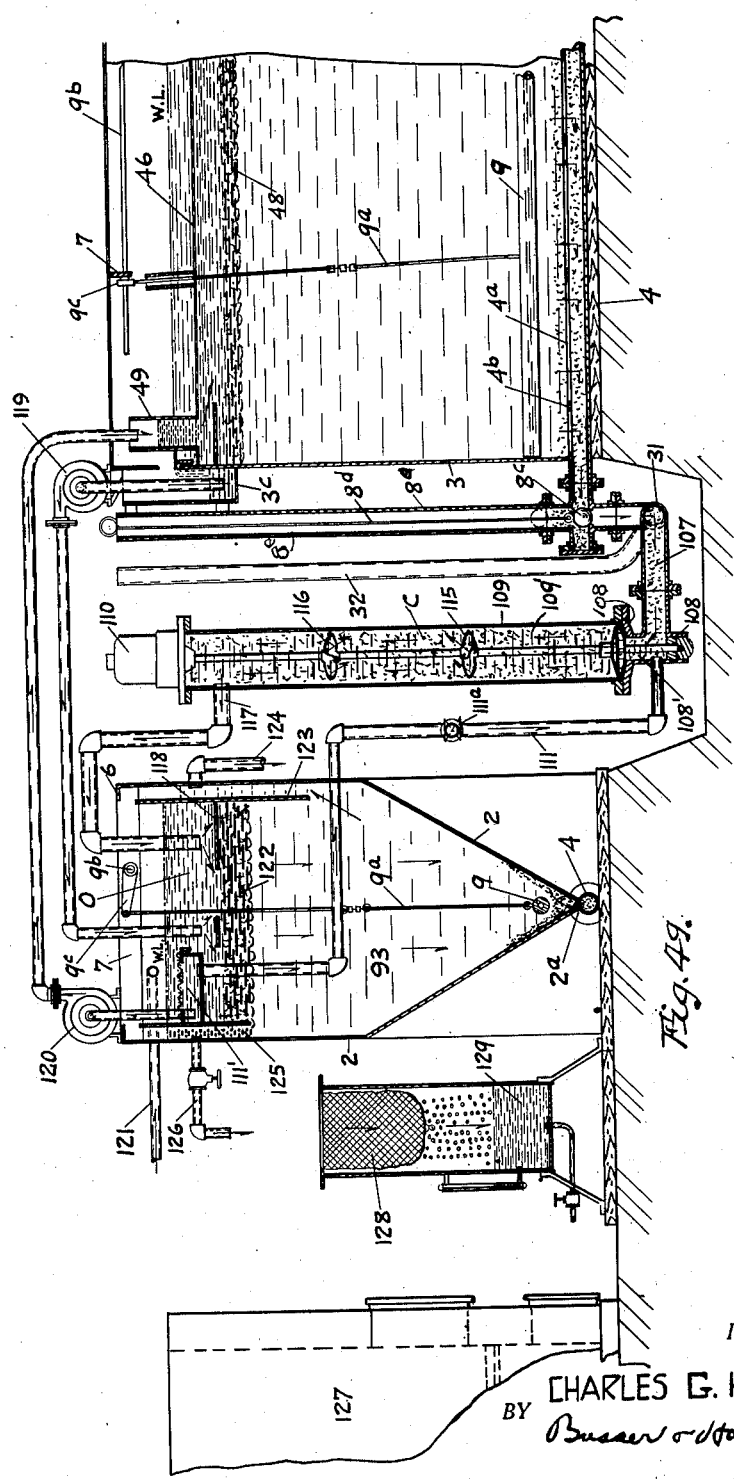

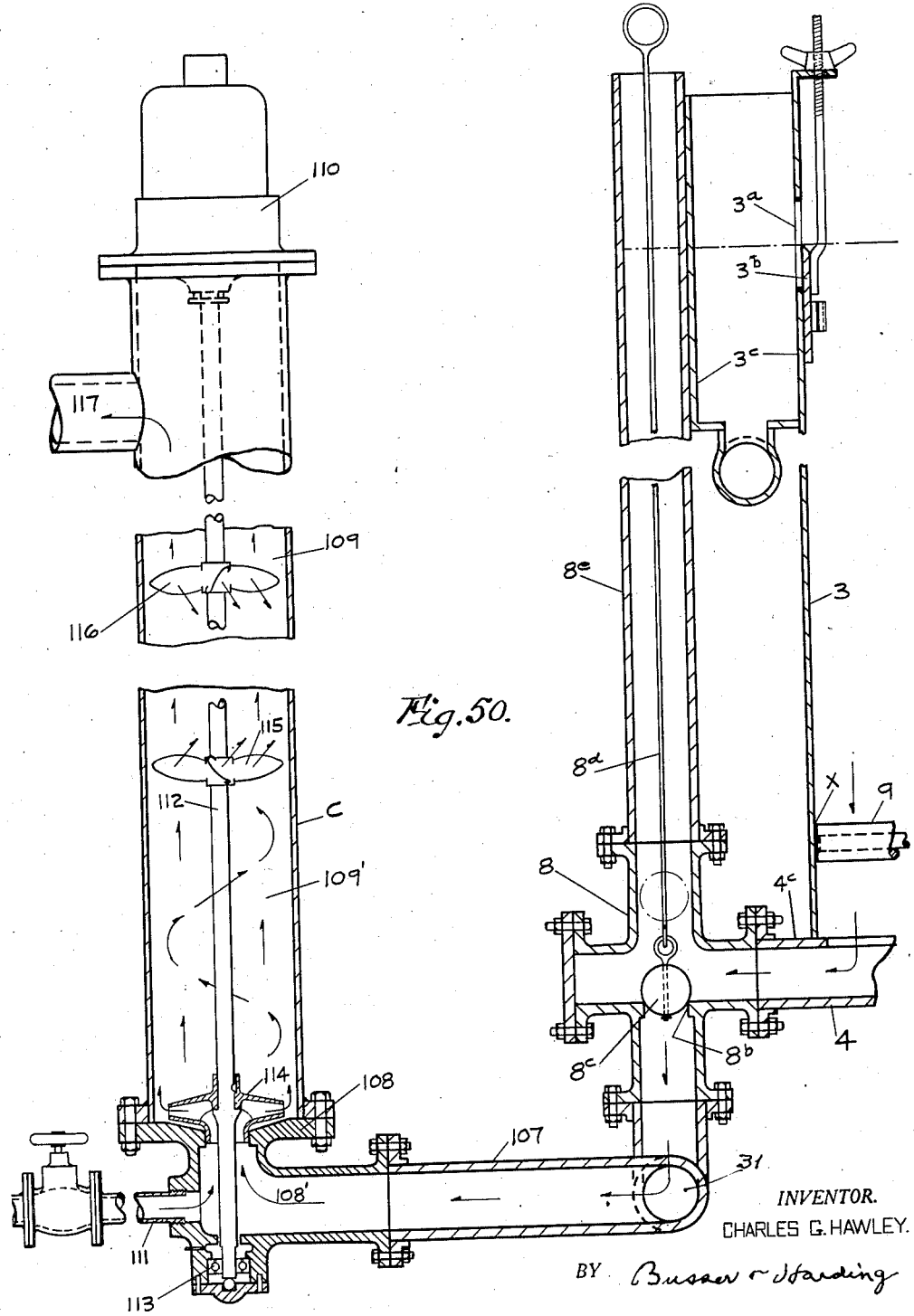

Dec. 31, 1940.   C. G. HAWLEY   2,226,532
SYSTEM OF WATER PURIFICATION AND WASTE RECOVERY
Filed March 24, 1936   24 Sheets-Sheet 18
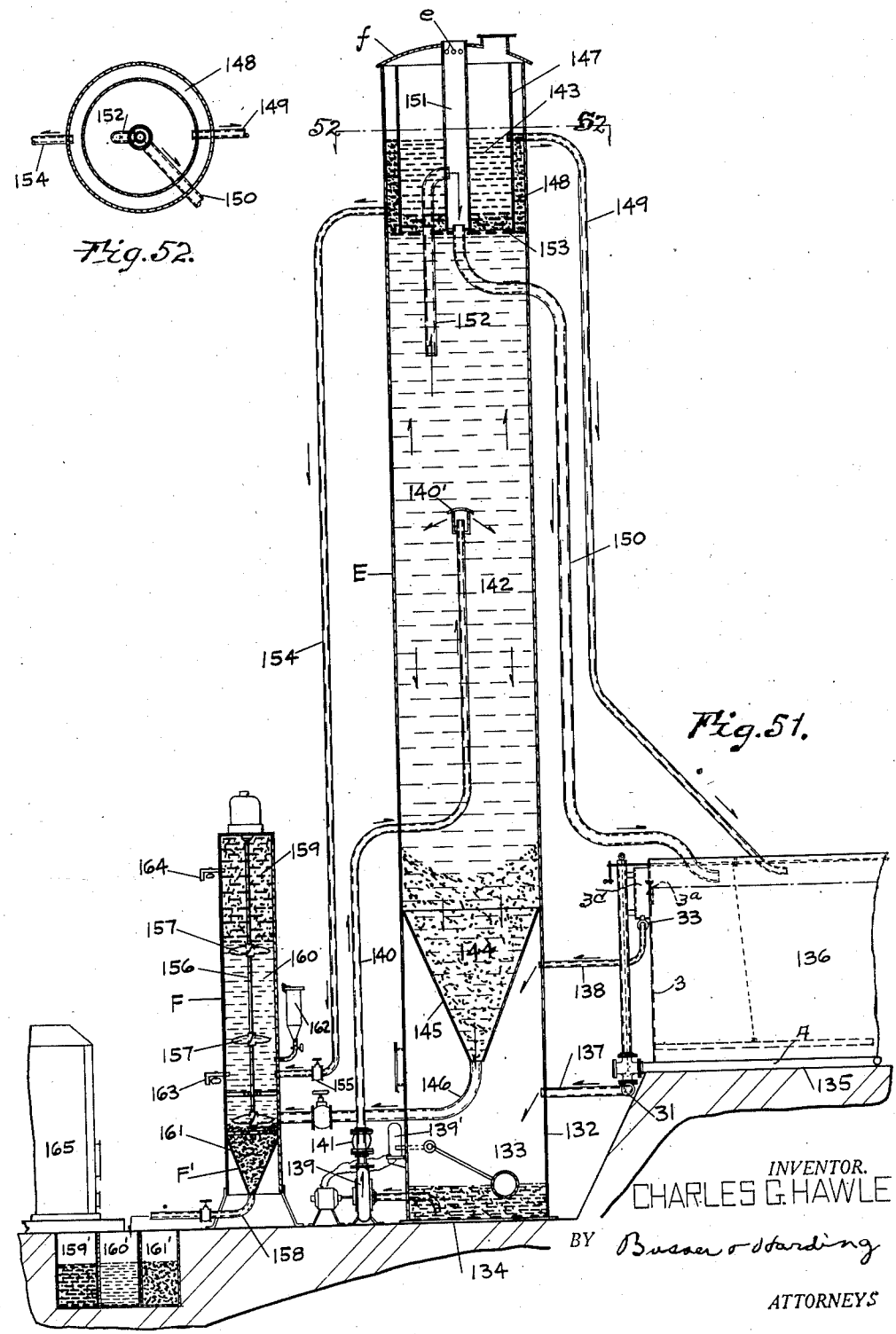
INVENTOR.
CHARLES G. HAWLEY
BY Busser & Harding
ATTORNEYS Dec. 31, 1940.  C. G. HAWLEY  2,226,532
SYSTEM OF WATER PURIFICATION AND WASTE RECOVERY
Filed March 24, 1936  24 Sheets-Sheet 19
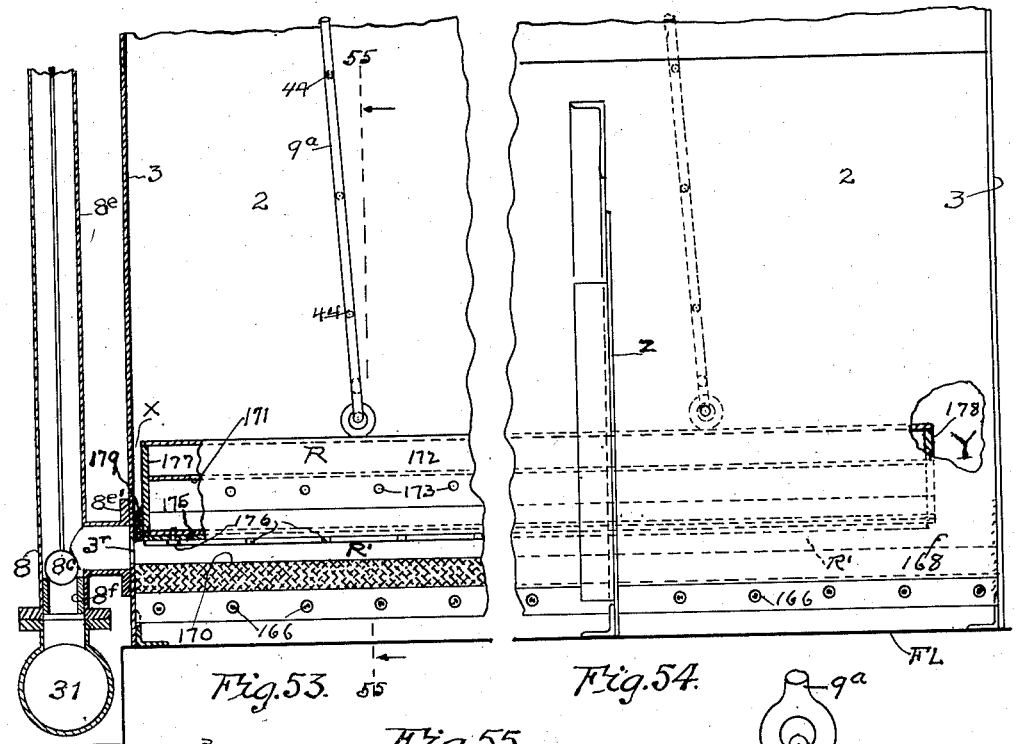
INVENTOR.
CHARLES G. HAWLEY.
BY
ATTORNEYS.

Dec. 31, 1940.   C. G. HAWLEY   2,226,532
SYSTEM OF WATER PURIFICATION AND WASTE RECOVERY
Filed March 24, 1936   24 Sheets-Sheet 20
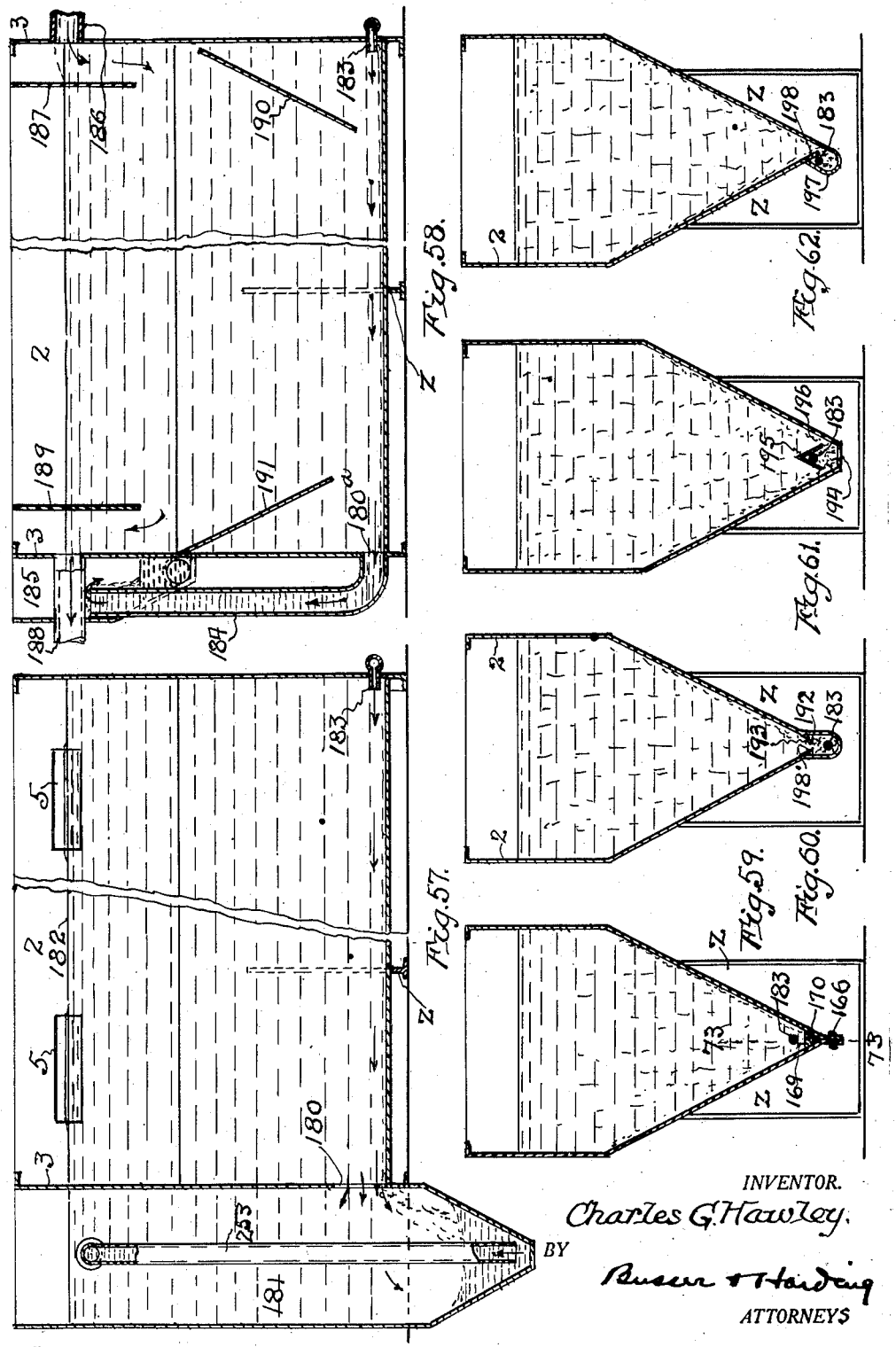
INVENTOR.
Charles G. Hawley.
BY
Busser & Harding
ATTORNEYS Dec. 31, 1940. C. G. HAWLEY 2,226,532
SYSTEM OF WATER PURIFICATION AND WASTE RECOVERY
Filed March 24, 1936 24 Sheets-Sheet 21

INVENTOR.
Charles G. Hawley
BY
ATTORNEYS

Dec. 31, 1940.　　　　C. G. HAWLEY　　　　2,226,532
SYSTEM OF WATER PURIFICATION AND WASTE RECOVERY
Filed March 24, 1936　　24 Sheets-Sheet 22
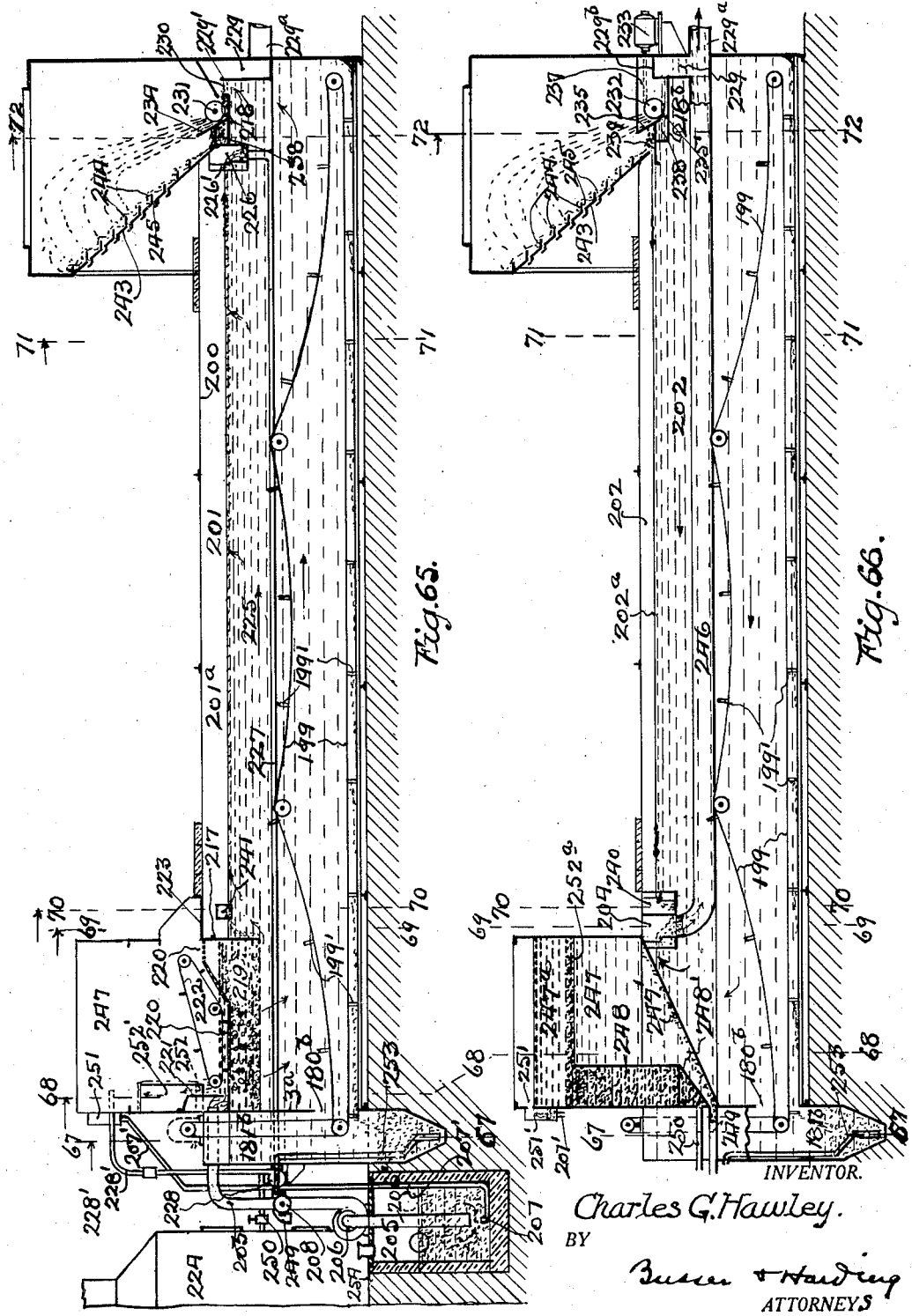
INVENTOR.
Charles G. Hawley.
BY
Busser + Harding
ATTORNEYS

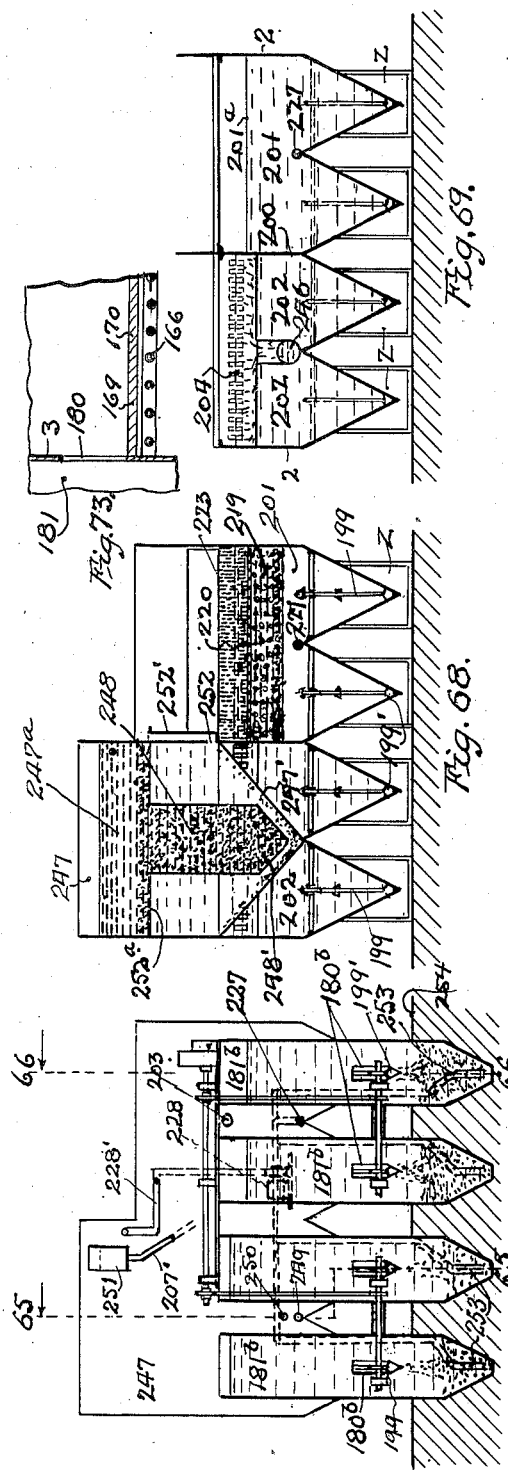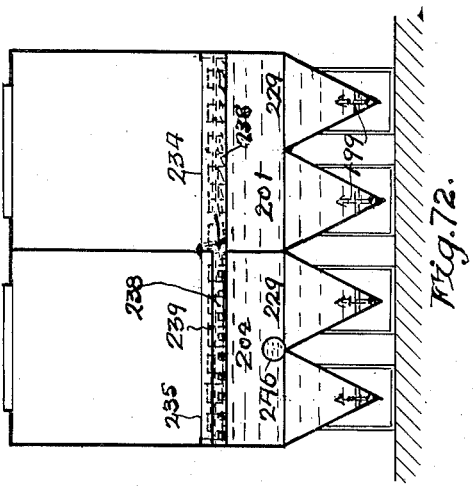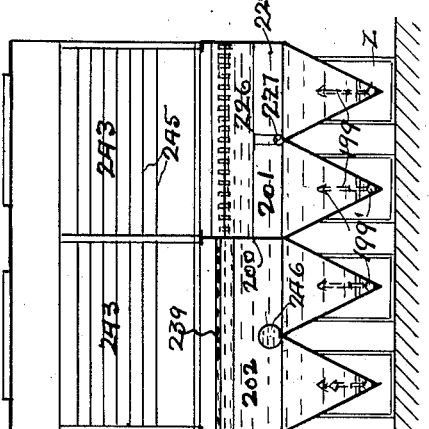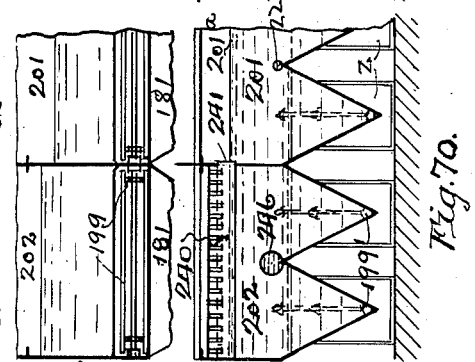

Dec. 31, 1940.   C. G. HAWLEY   2,226,532
SYSTEM OF WATER PURIFICATION AND WASTE RECOVERY
Filed March 24, 1936   24 Sheets-Sheet 24
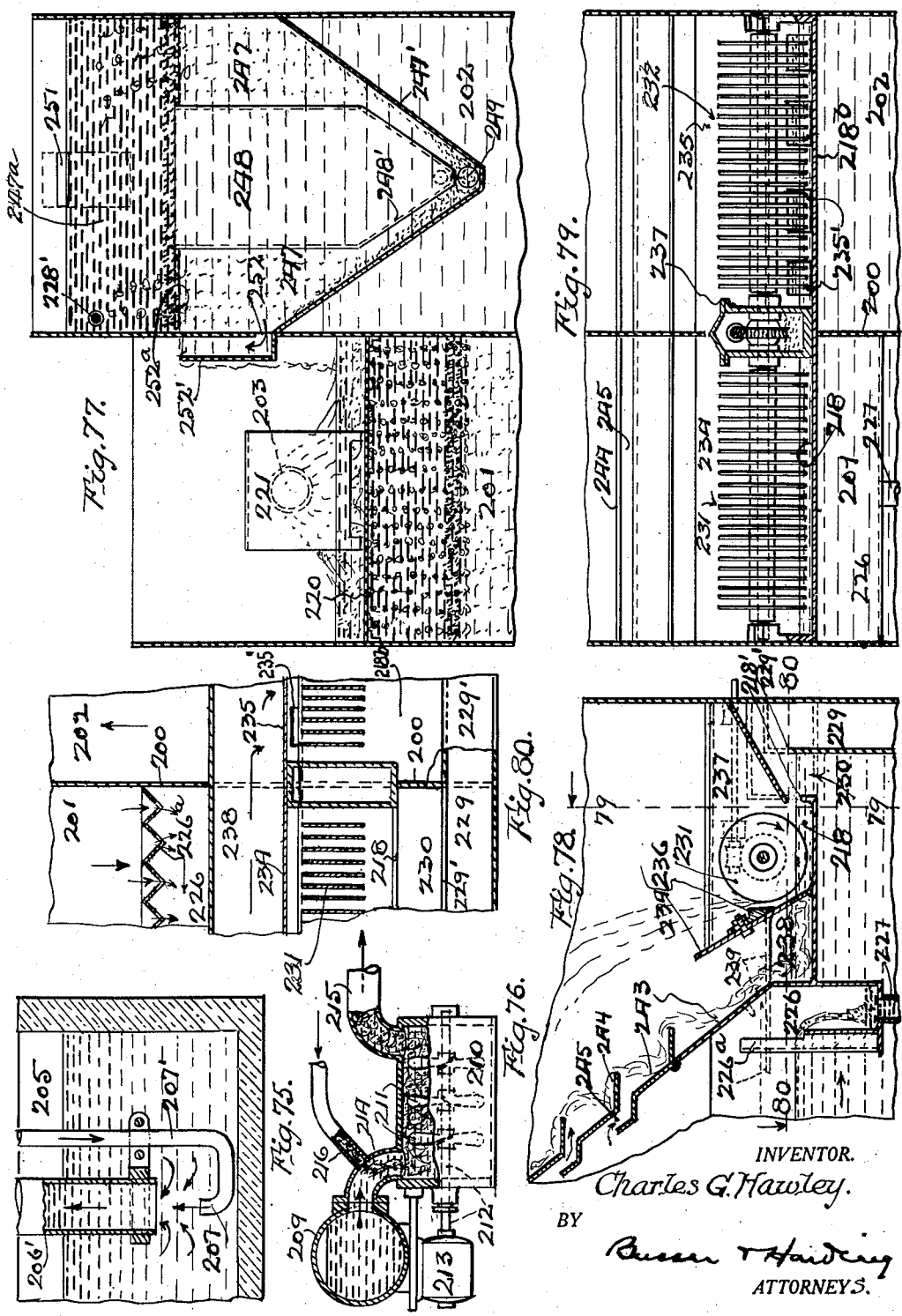
INVENTOR.
Charles G. Hawley.
BY
ATTORNEYS.

Patented Dec. 31, 1940

2,226,532

UNITED STATES PATENT OFFICE 2,226,532

SYSTEM OF WATER PURIFICATION AND WASTE RECOVERY

Charles Gilbert Hawley, Chicago, Ill.; Hope Hawley Degenhardt and Virginia Taylor Hawley, executrices of Charles Gilbert Hawley, deceased, assignors, by mesne assignments, to Hawley Engineering Corporation, Cleveland, Ohio, a corporation of Ohio Application March 24, 1936, Serial No. 70,569

13 Claims. (Cl. 210—2)

This invention relates to improvements in and for the purification of liquids at normal temperatures, especially the great flowing volumes of intake waters and of outfall waters, the latter generally termed sewage, used and wasted by municipalities and industrial establishments. Such purifications involve the elimination or separation of organic and inorganic matters from the water. Concurrently this invention is concerned with the use or safe disposal of such matters. The needs of both public health and comfort demand these operations and various industries also require them for economic reasons.

Many processes have been devised for such purposes but it may be fairly said that present systems either fall short of doing good work or, if capable of good work, are too expensive to admit of general adoption and use; and in consequence both domestic and industrial needs are inadequately served.

The objects of this invention are to provide water treating apparatuses suited to all working conditions and by means of which practically all processes may be practiced with better results; and to provide apparatuses that may be cheaply and quickly made, that may be installed at low cost and which may be operated with minimum effort and expense, all to the end that right treatments of waters and wastes may be begun and continued without imposing oppressive burdens upon the communities and industries benefited.

As will become apparent, chemical treatments of water are hereby simplified and made feasible; but such treatments are obviously optional and will not be particularly discussed herein.

Clearly, the foregoing objects include the provision and substitution of better processes and apparatuses in respect to cost, convenience, dependability and quality of work done.

To elucidate a governing principle it may be stated that there should be less rather than more dependance upon bacterial action; the extinction and suppression of living organisms enables quicker attainment of the desired results.

To attain these objects five principal problems must be and herein are solved.

1st. A speedy process of great flexibility must be and is here provided to enable prompt purifications of differently polluted streams of water, each to the extent suited to individual location and use.

2nd. Organic (volatile, putrescible) matters, oils and greases must be and here are quickly collected within and upon the water and promptly removed therefrom to prevent its recontamination; and then reduced to a non-putrescible state, without limitation to the action of living organisms. While inorganic matters are usually of less moment, they should be and hereby are removed from the stream.

3rd. Putrescible matters, together with accompanying living organisms, must be and herein are, promptly conditioned for final destruction without objectionable odors, as by combustion, distillation or the like, whichever may prove most profitable.

4th. The organic and inorganic substances removed from the water must be and herein are separated, one from the other, to avoid the embarrassments of the high ash content of ordinary sludges, which usually makes final disposition difficult. Likewise, the difficulties attending the disposal of watery sludges must be and herein are avoided. Inorganic substances should be and hereby are substantially freed from organic matter and may be disposed of without special treatment, the necessary preparatory functions being performed by the present invention.

5th. The apparatus employed for water purification must also be of a very flexible nature and is so presented herein in order that differing process-demands may be readily met; and for reasons of economy such apparatus must be and is here presented in forms and assemblages that can be produced at low cost and installed and operated at low expense, for otherwise no general public improvement in the condition of waters can be ensured or expected.

As will be apparent, these problems are definitely interrelated and must find solution in a unitary invention of true simplicity, rather than through attempts to improve present processes and apparatuses by additions thereto. Notwithstanding, it will become clear that the different parts of this invention are admirably suited to singular use and for addition to existing plants of various kinds.

As fully described hereinafter, this invention, in addition to a novel mechanical system of easily variable make-up, comprises a water purifying and waste recovery process made up and practiced in steps adapted to be variously related to meet different requirements. Similarly, its mechanical system is made up of unit parts which are adapted to differing arrangements.

Each step of this process is used to assist another or others to the ends sought. Obviously, differently burdened waters may well demand different treatments and the different steps and elements are serially combined, extended or omitted, as required to suit special needs.

Most commonly employed hereunder are the steps of sedimentation and levitation, here effected with certainty, and whereby impurities that are heavier than water and those which are lighter than water are assembled respectively at the bottom and top of the flowing stream, thence to be discharged so promptly as to preclude recontamination of the moving water.

Next to be mentioned is a step which persists throughout this process and which consists in maintaining all parts of the water in a state of movement and refreshment, stagnation in any part being avoided. Where organic substances are present any stagnation within the stream would cause objectionable conditions to prevail and impose unnecessary work upon the process of purification.

From the foregoing it will be apparent that the purpose or plan of this invention is to progressively freshen and improve the moving water and to remove therefrom promptly all decomposable substances, and also the accompanying inorganic substances. This plan is further effected as follows.

An important step of the present process consists in one or more times forcibly projecting or elevating the water into the air in the form of spray; a form distinct from streams, jets or droplets. Through such subdivision of the water in the presence of air, an abundant supply of oxygen is imparted thereto, thereby freshening it and resulting in the oxidation of organic matters therein, including those in colloidal and dissolved states. The latter frequently exceed, in weight, the settleable organic solids.

Ordinarily the oxidation of dissolved inorganic substances may be ignored, usual demands being satisfied by the mere collection and discharge of such inert matters.

Even raw sewage may be thus treated but it is better to aerate only settled sewage; and while this process may be employed with activated sludge, it is best to omit such a step and aerate the water only after settleable and floatable matters have been abstracted therefrom. Clearly, less work of oxidation then remains to be done and less time and power are expended in final purification of the stream.

Attending the step or steps of aeration hereunder (oxidizing the water while suspended in air) there follows a step of quiet settlement or sedimentation down stream from the region of aeration, and likewise a skimming step, these taking care of the settleable ash of oxidation and the scums resulting from such open oxidation. The scums here mentioned mark an important adjunct of the process; namely, such aeration serves to throw out of solution and to complete the unification, consolidation or saponification of those soapy, fatty substances which, because of diffusion, are usually so difficult of removal. By this process they are presented in the form of floating, soapy foam or scum of considerable tenacity and easy of removal from the surface of the stream.

All scums from the present system are treated alike, preferably in the oil mixing step about to be described. Such scums may be used or destroyed, as may prove best.

A further important step, feature or element of this invention comprises the interception and retention of the oils, greases and definitely organic substances present at any given location in a flowing stream, or such as are removed from various places therein. A light mineral oil, preferably a crude kerosene, is used for this purpose and hereunder a supply or body of oil is admixed with or interposed in a foully burdened stream or is employed therein after the stream has been partially purified, and/or is reserved and used only upon the sludges and scums that are taken from various parts of the treating systems. In the latter case both top and bottom sludges are dewatered, leaving to be dealt with only matters which require special treatment for their final disposition. By the inclusion of the organic matters in oil they are, obviously, ideally prepared for economical disposal. As before indicated, these matters are burned or otherwise safely disposed of.

The next foregoing statements will be further explained hereinafter. For the present it suffices to explain that this part of the invention is based upon the discovery of a strong affinity or mutual attraction between organic substances and an oil which is lighter than water, and upon the fact that matters which do not settle readily in water are, nevertheless, heavy enough to quickly sink in a body of light oil, which action facilitates final disposition, as will be further explained. Close admixture of the oil and water burdened with such matters is terminated or effected upon an underlying body of water that receives the added water and the matters which are not organic, for which latter the oil has slight, if any affinity. Oils and greases that accompany the burdened water to the place of admixture are miscible with the oil and are retained thereby, adding to the volume thereof. Befouled oil is withdrawn, either constantly or intermittently, and if need be replaced by fresh oil. The befouled oil comprises one terminal product of the process, relatively minute with respect to the other terminal product, to-wit, the clarified or purified effluent of the system.

A further novel step provided for inclusion in this process comprises a mechanically enforced aggregation of flocculation of matters remaining in the stream after primary purification has been effected. These are colloidal, and through this enforced aggregation they are converted into masses which settle to the bottom of the stream, to be readily disposed of with other sludges.

Still another step comprises a mechanically enforced aggregation and flotation of oil and grease particles, and by which such difficultly removable matters are added to the other scums from the system.

By preference, the last two steps should precede the above described step of aeration, it being obvious that the latter may best be relieved from such burdens and as far as possible, devoted only to the destruction of dissolved matters and objectionable bacteria.

As will become evident, the mechanical elements of this invention are appropriate to the above described process. Each element or unit is devoted to a clearly defined part of said process, which results in a system of parts and units that may be used and assembled in various numbers and orders. Upon ascertaining the nature of the purification work to be done, it now becomes possible to quickly provide units of the kind, number and arrangement needed to meet the ends sought and the usual great expenses of engineering and erection are avoided.

Specifically, the tank portion system of this invention comprises substantially identical troughlike tanks or units, variously related, fitted to desired uses, and all adapted for easy assembly on the ground. While not limited thereto the invention by preference is based upon portability and an all-metal plan of construction under which the trough-like units are of a standard metal construction and suited to ordinary means of transportation to and ready assembly at places of use. By such standardization, quantity factory production is brought into play, with great savings of material and labor, a saving which extends to operation, thus meeting all general sanitary and economic needs. And it now becomes economically possible to expand or repeat any herein defined step as and when desired.

The invention will be further understood upon reference to the twenty-four sheets of drawings that form part of this specification and wherein every effort has been made to illustrate all necessary functions and details; as required to enable others to successfully practice the invention in whole and in part. No attempt has been made to illustrate every possible form and use of the invention. Obvious modifications and various uses of the several parts will readily suggest themselves to those who are skilled in the many arts to which the invention and its parts are applicable.

Figure 2:
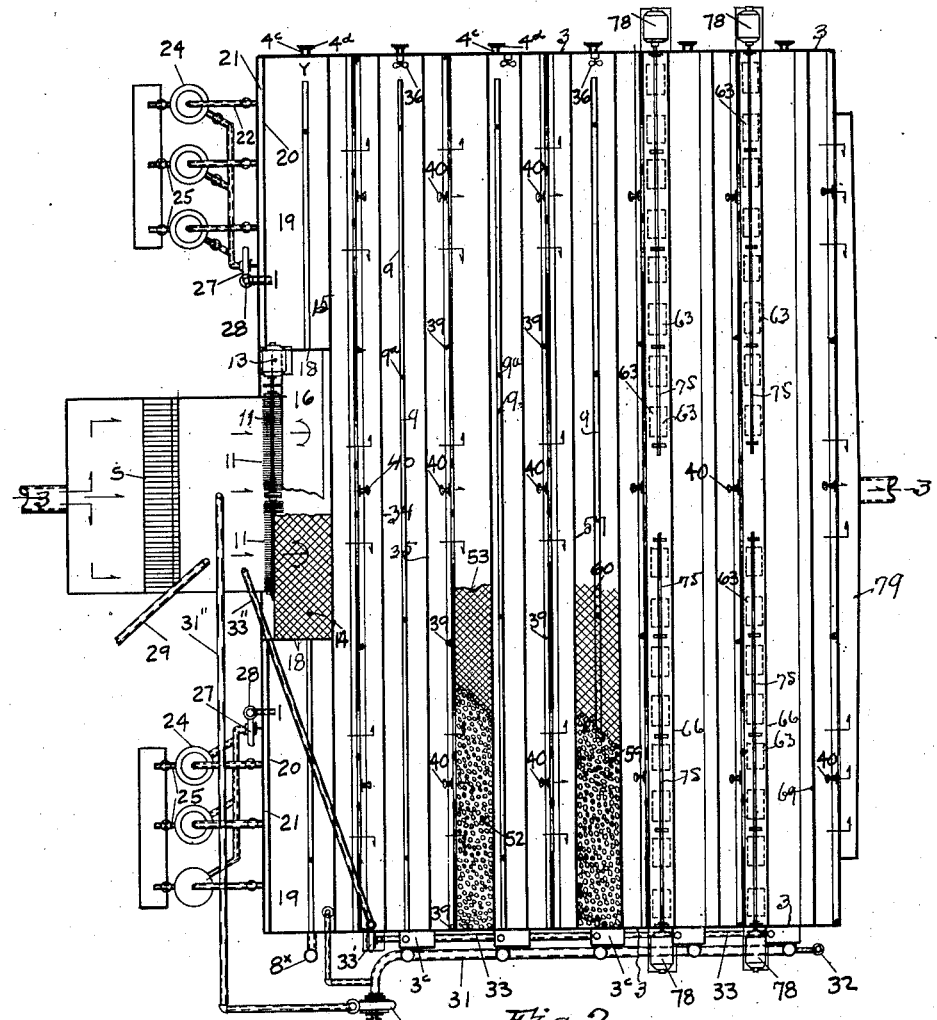
Figure 3:
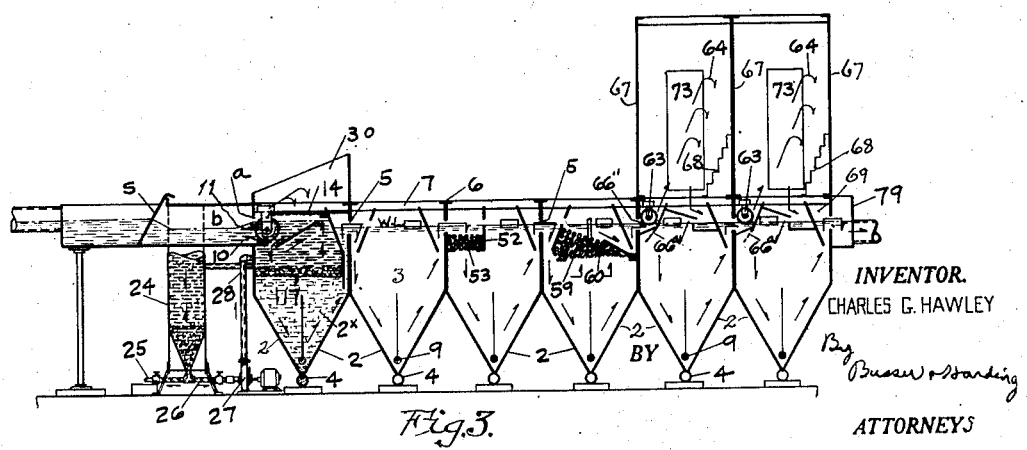
Figure 63:
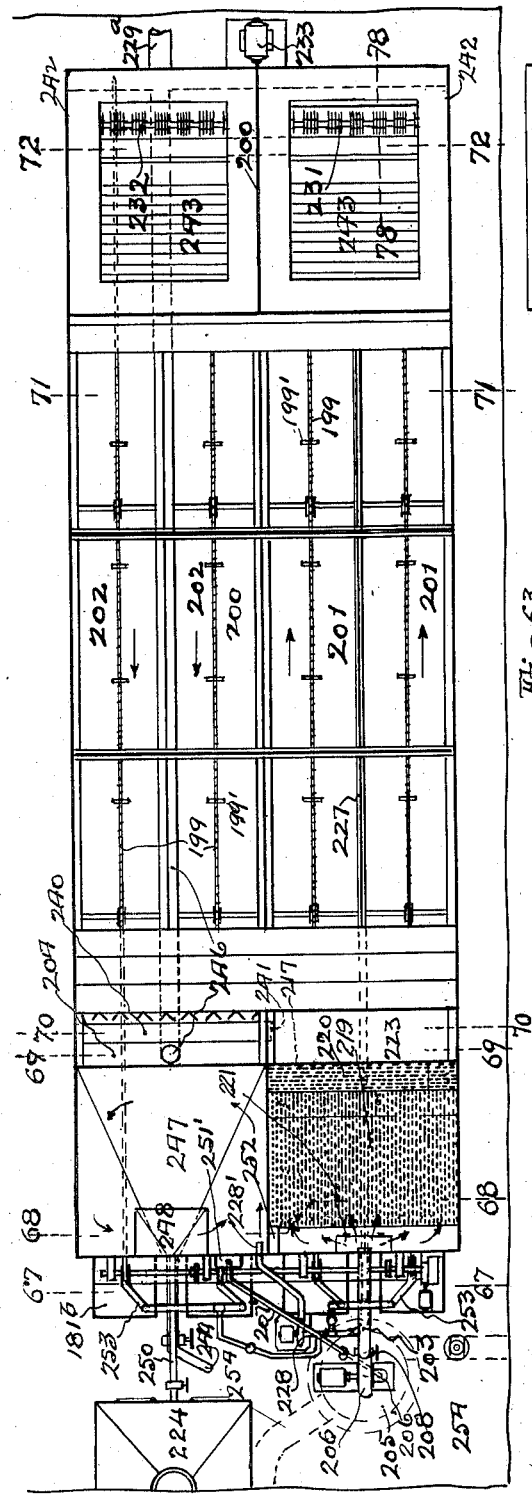
Figure 64:
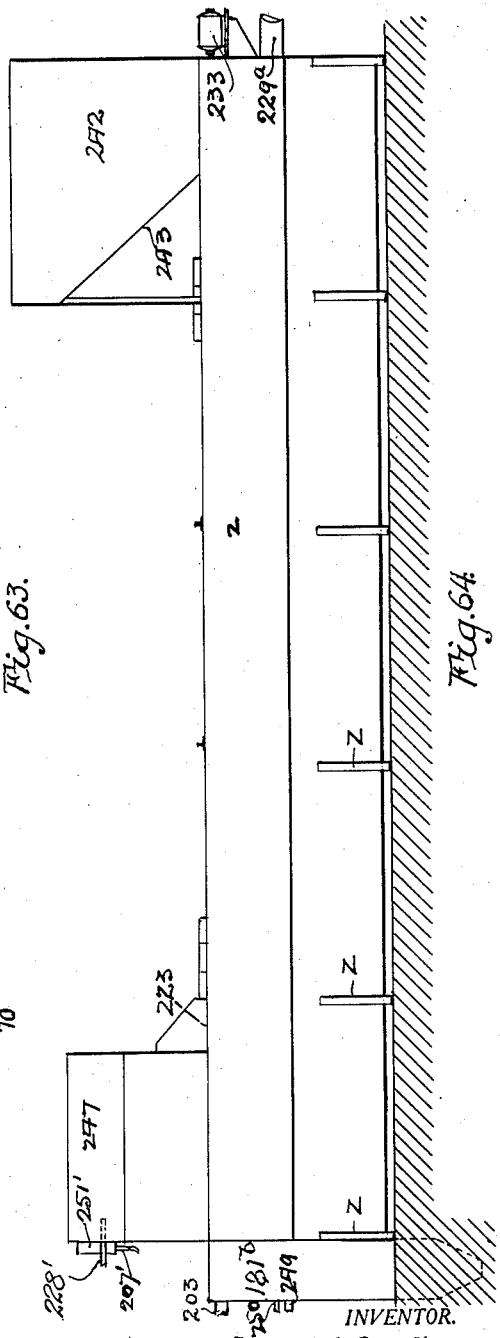

In said drawings, Fig. 1 is a perspective view, partly in section, illustrating a complete water treating system or plant embodying the invention; Fig. 2 is a plan view of the system of Fig. 1; Fig. 3 is a vertical section on the line 3—3 of Fig. 2; Fig. 4 is like unto Fig. 2 but illustrates the system in a form or assemblage having somewhat different adaptabilities; Fig. 5 is a vertical section on the line 5—5 of Fig. 4; Fig. 6 is a vertical section substantially on the line 6—6 of Fig. 4; Fig. 7 is an enlarged sectional view of the sludge tank, taken from Fig. 6; Fig. 8 is a longitudinal elevation of the sludge tank of Fig. 7, broken away in part to show its internal construction and operation; Fig. 9 is a plan view taken from Fig. 8; Figs. 10, 11, 12 and 13 are sectional elevations for comparison with Figs. 3 and 5, each illustrating a set-up or assemblage of parts suited to a different use; Fig. 14 is a vertical, longitudinal section of an assembly of parts or units providing for a longitudinal movement of liquid within the component tanks or units in contrast to the lateral movement of liquid exhibited in preceding drawings; Fig. 15 is a plan view taken from Fig. 14; Fig. 16 is a vertical, cross-section on the line 16—16 of Figs. 14 and 15; Fig. 17 illustrates another arrangement or assembly of the system components or units; Fig. 18 is an enlarged cross section of the first or reception unit employed in the system of Fig. 1, the section being taken from the line 18— of Fig. 20; Fig. 19 is a cross section on the line 19— of Fig. 20, adding the sludge settling column belonging to that unit; Fig. 20 is a vertical longitudinal section upon the line 20— of Figs. 18 and 19; Fig. 21 is an enlarged cross section of the sedimentation unit, most commonly shown in preceding figures, devoted to the gravity separation of the impurities; Fig. 22 is a longitudinal vertical section of the unit shown in Fig. 21; Fig. 23 is a plan view thereof; Figs. 24, 25 and 26 correspond to Figs. 21, 22 and 23 but show how the interior of the component or unit is modified to provide for the use therein of a body of mineral oil for the interception and retention of organic matters; Figs. 27, 28 and 29 likewise correspond with Figs. 21, 22 and 23 but illustrate the internal equipment provided for the mechanical aggregation or flocculation of colloidal matters; Figs. 30, 31 and 32 may likewise be compared with Figs. 21, 22 and 23 and illustrate the added internal parts appropriate to the aggregation of minute particles of oil and grease and the collection thereof; Figs. 33, 34, 34a, 35 and 35a may also be compared with Figs. 21, 22 and 23 to identify the fundamental unit and present the internal and superposed parts required to complete a liquid aeration unit; Fig. 36 is an enlarged cross section of the upper part of a system component or unit, particularly disclosing the warped or warpable baffles of this invention, also the position of a scum blowing fan which may be used in every unit; Fig. 37 is a fragmentary sectional view substantially on the line 37— of Fig. 36; Fig. 38 is a fragmentary plan view taken from Fig. 36; Fig. 39 is an enlarged sectional detail illustrating one sludge ejecting construction which is applicable to each system component or unit shown in preceding figures; Fig. 40 is a vertical cross section on the line 40—40 of Fig. 39; Figs. 41 and 42 are like unto Figs. 39 and 40 but show the sludge trapping rail or rod thereof in its lowered position; Fig. 43 is a plan view of the sludge ejector part, the bottom of the unit; Fig. 44 is an enlarged sectional detail better illustrating the colloid collecting baffles, employed in the lower parts of the several units depicted in Figs. 10, 11, 12, 13, 17 and 21 to 35; Fig. 45 is a longitudinal sectional detail better illustrating the spaced rotary disc constructions which comprise parts of the liquid aerating units of the system; Fig. 46 is a cross section substantially on the line 46—46 of Fig. 45; Fig. 47 is an enlarged sectional detail better illustrating the rotary disc arrangement of this invention which serves the double purpose of a self-clearing screen and an oil and water mixing or contacting device, as depicted in Figs. 1, 2, 3, 18 and 20; Fig. 48 is a sectional view substantially on the line 48—48 of Fig. 47; Fig. 49 is a sectional elevation, illustrating a modified sludge tank and disposal arrangement which may be employed with any sedimentation or levitation tank, and also better illustrates the bottom sludge discharge valve which may be a part of each unit herein shown; Fig. 50 is an enlarged vertical section illustrating the end of a system unit with its sludge valve and the sludge and oil mixing device adapted for use therewith; Fig. 51 is a vertical section of a tower-like sludge reception unit and an oil and sludge mixer which may be substituted for the structures of Figs. 7 and 49; Fig. 52 is a horizontal section on the line 52—52 of Fig. 51; Fig. 53 is a vertical longitudinal section illustrating a desirable modification in the form of the sludge collecting and ejecting structure; Fig. 54 is a side elevation of a portion of the modified unit; Fig. 55 is a vertical cross section of the modified unit, on the line 55—55 of Fig. 53; Fig. 56 is an enlarged construction of the trough-shaped unit bottom and of the so-called sludge rail which coacts directly therewith; Fig. 57 is a longitudinal vertical section illustrating another way of discharging settled sludge from the trough bottom and into a static sludge reception space or pocket; Fig. 58 is a like view showing how the last named pocket may be replaced by a flowing hydrostatic or pump created movement of the sludge; Figs. 59, 60, 61 and 62 illustrate various cross sectional forms and constructions which may be adopted in making the troughlike tank units and providing for the conveyance and discharge of settled sludges;

Fig. 63 is a plan view of a complete system embodying this invention, typified by a longitudinal movement of the liquid in the assemblage of troughlike units which constitute the tank; Fig. 64 is a side view thereof; Fig. 65 is a longitudinal vertical section substantially on the line 65—65 of Fig. 67; Fig. 66 is a like view on the line 66—66 of Fig. 67; Fig. 67 is a vertical cross section substantially on the line 67—67 of Fig. 65; Fig. 68 is a cross section on the line 68—68 of Fig. 65; Fig. 69 is a cross section on the line 69—69 of Fig. 65; Fig. 70 is a partial cross section on the line 70—70 of Fig. 65; Fig. 71 is a cross section on the line 71—71 of Fig. 65; Fig. 72 is a cross section on the line 72—72 of Fig. 65; Fig. 73 is a fragmentary sectional view on the line 73—73 of Fig. 59; Fig. 74 is a cross section illustrating the fact that the tank or trough bottoms may be of full width and flat; Fig. 75 is a large sectional detail illustrating the manner in which oil is introduced to the sewage pump and is to be read in connection with Figs. 63 and 65; Fig. 76 illustrates a modified method of mixing oil with the incoming liquid; Fig. 77 is a vertical cross sectional explanatory detail with reference to the use of mineral oil and is to be read in connection with Figs. 63, 65 and 66; Fig. 78 is an enlarged vertical and longitudinal sectional detail substantially on the line 78—78 of Fig. 63 and is to be read with Fig. 65; Fig. 79 is a fragmentary vertical cross section on the line 79—79 of Fig. 78; and, Fig. 80 is a horizontal section on the line 80—80 of Fig. 78.

In the light of the preceding descriptions, the drawings are substantially self-explanatory; and clearly, they serve to explain further the course and action of every part of the defined process. The following explanations will make all other matters clear.

Referring to the exemplary arrangements shown, it will be noted that in accordance with the plan and principle announced, the basic units or tank components of this invention are of light weight, relatively narrow, and shallow; to fit them for easy handling and transportation. They have preferably steeply inclined V-shaped bottoms which serve in sludge collection and discharge. These units are of thin-walled metal construction throughout, preferably factory welded; except where two or more need be joined together end to end in the field. All are of the same external cross-section. When communication ports, 5, standard as to position and size, are provided in the upper side portions of each unit, such units are adapted for assembly side by side without the interposition of added parts. The parts which distinguish one unit from another and which adapt them for different uses are arranged within them and therefore do not complicate or interfere with such close assembly of the units.

By preference, the direction of stream flow is from side to side of each trough-like unit, the water passing through the communicating ports mentioned, all as well shown on Sheets 1, 2, 3 and 5. However, the water may move longitudinally through the units, as depicted on Sheets 6, 21 and 22. The various unit arrangements and many of their uses will be again referred to.

The best basic units, individualized as to use, are well illustrated on Sheets 7 to 12. Certain cross-sectional modifications appear on Sheets 19 and 20.

As shown, each such unit is an open topped plate-metal tank comprising sides 2, 2 and one or two ends 3, 3. The upper side portions are in parallel planes and for cross-flow purposes contain the communication ports 5. The lower portions of the side plates, 2, are inclined, inward and downward, and form the lower part of the unit into a V-shaped trough. The tank bottom proper comprises the longitudinally extended bottom of that trough and may be formed in any of the ways shown, and in other ways if desired.

Throughout the main views of Sheets 1 to 18, the trough bottom is shown to comprise a tubular bottom element 4; easily identified therein. Simpler and more frequently used forms of the tank bottom are shown in Figs. 53 to 62. In the earlier views a vertically movable element, termed "sludge rail," marked 9 in the main views and R in Figs. 53 to 56, is provided for coaction with the tank bottom and a valve, 8, which will be mentioned; all three parts being there required for the collection and discharge of solids that settle in the elongated bottom of the tank. Further reference will be made to these parts.

The upper edges of the tank sides, 2, and of the ends 3, are best provided with inwardly extending stiffening flanges 6, as shown; and, the opposite sides of the tank are nicely spaced and joined by a number of cross bars 7. By preference, the latter are detachable, to enable easy placement of internal parts.

The tank having the tubular element 4 is detailed in Figs. 39 to 45. The interior of that tube and the interior of the tank are in open communication through a longitudinally extended slot or series of slots 4a in the top of the tube. Short slots are preferred, separated by integral bridge portions 4b which prevent either distention or collapse of the tube 4.

As shown, the tank sides are welded to the tube 4 and to the end plates 3. The ends of the tube extend through the plate 3 and present unslotted projecting portions 4c, provided with suitable flanges. The open ended element 4 permits easy cleaning thereof, if need be. One end, 4c, is normally closed by a blank flange 4d. The other receives a normally closed sludge discharge valve; for example, the valve 8' of Fig. 22 or that marked 8 in Figs. 25, 28, 31, 49 and 50.

The element, 9, is called a sludge bar or rail and by preference comprises a metal core 9' and a covering 9" of yielding rubber or the like, best adapted to fit against the tank surfaces, as to be described. It is suspended and operated by means of a plurality of slightly pitched hanger chains or rods 9a and by gravity its flat end is thrust against one end of the tank, as shown at points X. The bar is of less length than the tank, thus leaving a space, Y, at its other end. The eyes 9''' fastened in the core 9' furnish the swivel attachments for the operating chains or rods 9a.

The sludge rail is normally raised and suspended out of contact with the slanting sides of the tank. At such times it does not interfere with the fall of sludge and the element 4 is open to receive sludge and may become full thereof. When the rail is lowered into contact with the sides of the tank it closes off almost all of the slotted element, 4, leaving open only the said space Y between the free end of the rail and the adjacent end of the tank. Sludge is thus trapped in the bottom element, 4, and such charge of sludge is discharged from the element 4 (as through a gun barrel) under a hydraulic head created when the sludge valve is opened at the end of the element 4.

That sludge valve is such that it may be opened at any time, an advantage in itself; and it is of distinct advantage that the sludge capacity of the element, 4, is small and that a brief opening of the valve suffices to discharge the trapped sludge with a minimum of accompanying water. The quantity of discharged water is so small as not to affect the water level in the tank and, being small, presents a much simplified problem when sludge disposal begins.

Most conveniently, the rail hangers 9a, are raised and lowered together by means of a rocking shaft 9b, which extends longitudinally through the cross bars 7, the means of connection comprising rocker arms 9c. An operating crank 9d is provided on the free end of the rocking shaft 9b.

The sludge release valve at the end of the tank bottom may be of any suitable type but preference is held for valves of the types exhibited by the mentioned parts 8 and 8', shown in Figs. 22, 23, 49 and 50. The casing of such a valve, as well shown in Fig. 50, contains a round hole and horizontal valve seat 8b. For this is provided a self-seating ball-shaped valve 8c. The latter is raised manually, as by a swiveled link 8d. Further preference is held for the standpipe 8e which is open at the top above water level so that no packing is required and if need be, the valve 8c may be freely removed.

In practice, the basic unit is made of quarter inch plate steel and is railway car length, four feet wide and not over eight feed deep. Where smaller capacities are required the units may be shorter but this width and fixed depth are best retained for sake of shop standardization. Such dimensions admit of the addition of underlying brackets or cradles, as shown at Z in Fig. 7, and in Figs. 53 to 62, and yet permit ready shipment upon railway cars and otherwise. As will be apparent, the weight of the metal unit is not great, yet it is very strong and such units are easily handled in shop, shipment and erection.

Having the foregoing convenient dimensions in mind, it is now stated that unit assemblages or systems of the sizes shown in Figs. 1 to 13 have daily working capacities of two hundred fifty thousand to five hundred thousand gallons of outfall water or sewage, depending upon the nature of the influent; and greater capacities for intake waters.

The foregoing facts are given to serve as general guides and to convey a proper understanding of the economic character of the invention. Obviously, by such means the described process can be limited or extended within a very wide range, as required to secure effluents of desired qualities.

Water treating units thus made of steel might be thought to lack durability but on the contrary it is customary to paint surfaces that are exposed to corrosion and it will be found that these units are very durable and also easy of maintenance. It is rarely necessary, even when using corrective chemicals, to employ special metals or materials other than metal. Concrete construction following these or equivalent designs may be made to serve so far as the process is concerned but are to be avoided because they are more costly, less convenient to fit out and more expensive to maintain.

The construction of the basic unit being now understood, attention is directed to the internal parts or fittings adapting them to the several functions and uses above defined. These matters will be considered in the order in which the various units are detailed in Figs. 18 to 35; although the fitted units are not limited to use in such order.

As before stated, Figs. 18, 19 and 20 (Sheet 7) apply to the first unit to appear in Figs. 1, 2 and 3; i. e., to a system wherein incoming sewage or the like is at once admixed with mineral oil and is thereby substantially freed from organic matters, including other oils and greases. By such removals, the work to be done in and by the succeeding units is advantageously reduced.

Such a unit has an inlet opening, a, in its side to which an influent channel b, is joined. The latter may contain a coarse bar screen, S, if desired. An extension, 10, of the bottom and the sides of the channel is provided within the unit. That space is occupied by a multiple disc rotor, 11, the shaft 11' of which has bearings 11" in the sides or ends of the extension, 10, and is equipped for rotation by a small motor 13.

The multiple disc rotor 11 is best shown in Figs. 47 and 48 (Sheet 15). It is composed of a large number of closely spaced discs 11a which are mounted fixedly and perpendicularly on the shaft 11'. Spaces between the sides 10 and the ends of the rotor are blocked off by parts attached to said sides, as shown at 10a, 10a. Obviously, this rotor now forms a fine screen which forms the only avenue through which the influent water may enter the tank unit. Next, the rotation of that screen serves to keep it clean and also serves to throw upward and onto a drain board or horizontal screen 14, all arriving objects which are too large to pass between the discs.

This rotor 11 performs another important function; it serves as an oil-and-water mixer as follows: The tank unit, as shown in Fig. 18, is normally filled with flowing water and a deep body of oil, which rests thereon. Comparative levels are governed by the position of the exit ports 5 in the down-stream side of the unit. Escape of the oil is prevented by an upright internal baffle 15 which extends from end to end of the tank and to a level considerably below the lowest level of the oil body. The oil being lighter than water, rises above the water level, WL, partly submerging the rotor.

The liquid to be treated enters through the channel, b, in the direction of the arrow. The rotor operates, so to speak, against the flow, being rotated in the direction indicated by arrows. As the inner side of the rotor is partially submerged in the oil body, its discs are constantly bathed and filmed with oil. Thus oil is thinly spread upon extensive surfaces and the incoming water being finely subdivided by the spaced discs, is compelled to accept very intimate contact with the oil films. The water, still in subdivided condition, has further contact with the oil as the water passes downward through the body of oil to reach the interface 17 between the oil and the underlying body of water. In consequence, the organic matters as explained, are reliably transferred from the incoming liquid to a state of suspension and retention in the oil body.

The incoming and thus subdivided stream of water sinks through the oil, and after a sufficiently prolonged period of sedimentation in the lower part, 2x of the unit, passes upwardly through the space 15a between the side of the unit and the baffle or oil retaining partition 15.

A plate or coarse screen 16, preferably located within the oil body, is used to minimize the disturbing forces of the descending water at the interface 17 between oil and water.

It is to be noted that screened substances deposited on the drain board 14 are showered and thus made odorless by oil which is thrown off from the top of the rotor.

The organic matters caught by the oil sink to or toward the interface 17, collecting thereon. It is desirable that they be transferred from that position to points of quieter storage. To that end, transverse partitions 18, 18, are provided at each side of the rotor. These are not as deep as the baffle 16 and as befouled oil accumulates in the lower part of the space containing the rotor, the foul portion passes beneath the baffles 18 and thus enters the undisturbed open spaces 19, 19 within the tank. Oil exchange ports 18' are provided in the cross baffles 18 so that all of the compartments are equally filled with oil. The compartments 19 contain vertical, longitudinal partitions 20, forming riser ducts 21 that gradually receive the befouled oil from the quiet settling spaces 19. Such befouled oil is withdrawn from the risers 21, as by means of pipes 22 (see Figs. 1, 2, 3 and 19) or through an outfall box such as marked 23, in Figs. 4, 6, 7 and 9, to which later reference will be made.

The part marked 24 in Fig. 19 and also shown in multiple in Figs. 1 and 2, is a settling column which, having been filled with foul oil through the pipe 22, is allowed to stand until a final settlement of the heavier organic matters has occurred, as represented by the drawings. Thereafter, the heavy matters are withdrawn through the valve pipe 25. Then that pipe is closed and the larger residue of relatively clean oil is withdrawn through the valve pipe 26 and returned to the tank by a motor driven pump 27 and pipe 28. Compensating quantities of oil are supplied as needed, through a pipe 29 entering the channel, b, see Fig. 2.

The part 30 is a splash guard placed on the top of the unit above the rotor 11 and screen 14.

When several units have been assembled, as in Fig. 2, the sludge discharging elements 4 of all thereof are connected to a common header 31, of which 32 is the vent. Likewise, all of the scum boxes 3c, are connected by a header 33 (see Fig. 2). Motor driven pumps, 31' and 33' are provided for effecting suction and to transfer the sludges from headers 31 and 33 to the influent channel, b, through respective pipes 31" and 33". These pumps are individual to the direct oil mixing reception unit of Figs. 1, 2, 3, 18, 19 and 20.

An important incident of this part of the invention has particular reference to sewage treatment and consists in the ability hereby afforded to clean sewage grits as they enter the disposal system. By the step and means here defined, the grit and finer inorganic matters are effectively bathed with oil. Thus the organic matters are washed therefrom and are held by the oil, and only clean grit and the like sinks to the bottom of the tank unit. Obviously, such substantially clean earthy matters may be discharged from the bottom of the tank at will and may be disposed of without further treatment; hence it is to be noted that the sludge valve 8x of this unit is independent of others and is not connected with the sludge header 31 (see Fig. 2). By this oil treatment a simple solution is provided for the hitherto annoying grit disposal problem.

An important element of this invention consists in neutralizing and suppressing sewage odors. The described intimate admixture of mineral oil with the sewage has this effect, in whatsoever manner admixture is accomplished; and is a feature to be noted throughout this specification; wherever the oil and foul water are admixed.

As briefly mentioned, the basic unit of Figs. 21, 22 and 23 (Sheet 8) is especially fitted for sedimentation (care of settleable solids) and levitation (care of scummy matters, lighter than water). Reference will also be made to Figs. 36 and 38 which better illustrate the detailed construction and arrangement of the opposed stream control baffles 34 and 35 that chiefly distinguish this sedimentation unit. As shown, the baffles 34, 35 are oppositely inclined and they are spaced from the sides of the unit. The baffle 35 is imperforate but scum may accumulate in the space 34' and the baffle 34 is provided with scum release slots 34s, at several points and about at water level.

Essentially, the baffles 34 and 35 serve to form capacious open bottomed distributing troughs, 34' and 35' in the upper part of the unit. The baffles extend both above and below the water level, WL, maintained therein and they extend from end to end of the tank. The before mentioned side ports 5 are arranged in spaced groups as shown, and the extended troughs 34' and 35' respectively control the inlet and the outlet of the water through the spaced ports. The direction of flow is well shown by arrows in Fig. 21 from which it will be seen that the baffle 34 serves to direct entering water downward from end to end of the trough; through the long slot or opening 34" in the bottom of the trough 34'. Thus directed, descent of the water into the lower part of the trough is ensured and thereby the settlement of suspended solids is expedited. The action is well illustrated. After passing slowly across the capacious lower part of the tank, the water escapes upward into the trough 35' and departs through the ports 5 leading therefrom.

Meantime, and by reason of the very slow cross movement of the water in the lower part of the tank, the floatable matters therein are permitted to rise to the water surface between the two baffles. Collecting thereon as scum, such matters are discharged end-wise of the tank and outward into the scum box 3c, over the before mentioned scum weir 3a. That skimming action is here ensured with a minimum of accompanying water.

To the same ends a small rotary air blowing fan 36 is installed above the water at the other end of the tank. When in action the fan serves to air-drive the scum lengthwise of the tank and out of the scum outfall hole 3a. Such fan is shown in Fig. 36; and also in Figs. 2 and 4, being a feature common to all units hereof, except those presenting oil surfaces, where they are not needed.

Most conveniently, and as best shown in Figs. 36 and 38, the baffles 34 and 35 are metal plates stiffened at the top by flanges 37 and suspended from the cross bars 7 by pivot lugs 38. The lower edges of the plates are not flanged and are readily warpable or bendable; which capacity is employed in varying the width of the control slots between the same and the sides, 2, of the tank. Such variation of width serves to make the vertical flow of water uniform from end to end of the tank.

A long recognized difficulty is overcome by so varying the widths of the control slots at the bottom of the distributing troughs 34' and 35'; i. e., over-pronounced cross currents in the lower part of the tank are obviated. The advantages of cross or lateral flow settling tanks have long been recognized, chiefly because of the slow progress of the water therein. But hitherto attainment of uniform admissions and discharges have prevented the satisfactory operation of such tanks.

The means here devised for warping the baffle plates 34, 35 or the like, comprise elements of two kinds. First: Lugs 39 fixed on the baffles or, as shown, upon the sides of the tank, beneath and between the groups of side ports 5, and preferably near the ends of the tank. The lower edge of each plate is held against such lugs, as shown, and thereby the maximum distance between tank side and baffle is established. Second: Pivotally attached turnbuckles 40, which are positioned between each baffle and respective tank side, 2. These turnbuckles are positioned midway between the spacing lugs 39; that is, midway between respective groups of ports 5. Obviously, by shortening the turnbuckles the lower edge of the baffle may be properly warped and drawn toward the tank side. The uniform section of the metal baffle is an aid in this regard and in this way the baffle may be warped gradually and to the exact extent required to properly vary the width of the opening from end to end and thus quantitatively control the passage of water from or into the described distributing troughs.

In contrast with any permanent fastening of the baffles in the tank, the construction shown in Fig. 36 is specially advantageous; because of the capacity to adjust either baffle at any time; and further, the baffles thus become readily detachable.

Before leaving Figs. 36 and 38, attention is called to the fact that they clearly exhibit the manner in which adjoining tank units are fastened together side by side. As before indicated, the side ports of each tank match or register with those of the next. Packing material 41 is placed between the tanks, around the ports; and the tanks are fastened together by short bolts 42 which pass through the packing material and the tank sides 2. In this manner all joints between the tanks are made tight. A welding method, while permissible, would prevent easy disconnection.

Attention is directed to the novel longitudinal baffles 43 provided in the several basic units exhibiting the cross flow. These baffles extend longitudinally within the lower parts of the units and are best shown in Figs. 21 to 31 and also in Fig. 33 where the baffle is differently positioned. Each is nearly as long as the tank which contains it and each is best composed of many blades 43' which are commonly inclined so that the baffle as a whole resembles a Venetian blind. Most conveniently, the blades are attached to the studs which project from the hanger rods 9a; and as well shown in Fig. 44, each horizontal row of studs serves to space the blade above it. Obviously, in Figs. 21 to 31 these open baffles move up and down with the hanger rods belonging to respective sludge rails 9; while in Fig. 33 the blades, in reverse position, are supported by fixed hangers 45.

Each baffle 43 serves two main purposes. It receives and checks the downward flow of the water which enters the unit and makes the cross movement of the water still more uniform. Next, each baffle serves as a colloid and slime collector whereby minute particles are successfully gathered. Such slimes drip from the blades and sink to the bottom of the unit, for disposal along with other solids precipitated therein.

The basic unit illustrated in Figs. 24 to 26 is fitted to serve as an oil mixer or contact device and may be compared with the previously described construction of Figs. 18 to 20 (Sheet 7). But in the case of Sheet 9 no moving parts are involved, for the function of finely subdividing the incoming water is performed by an immovable perforated plate 46. That plate extends longitudinally and from the inlet side of the tank to the baffle 47 which guards the outlet ports 5. For convenience, an access opening 51 is provided at one end of the tank so that the interior of the tank can be reached without disturbing the plate 46. As shown, the plate is situated below the water line WL. The movement of the water is indicated by arrows. A supplied body of mineral oil 48 is trapped below the plate and behind the baffle 47. The oil is introduced through an open standpipe 49.

The trapping of the oil beneath the water level WL is explained by the size and spacing of the many holes 46' in the plate 46. Those holes are smaller than drop size and therefore surface tension explains the non-upward passage of the oil; leaving the holes to function as thin orifices for the downward passage of fine streams of water. Here again the force of surface tension comes into play and the streams are broken up into many small globules. These present extensive surfaces to the oil 48 and disengage only at the interface 50. In this manner organic matters are transferred from the water to the oil body, as before described. Such matters sink to the interface and are released below the lower edge of the baffle 47, thence rising behind the baffle 47, to be discharged with the water. As will later appear, the scum thus made is collected in the next unit and is discharged therefrom.

The unit illustrated in Figs. 27, 28 and 29 (Sheet 10) has internal parts which fit it to serve as a mechanical colloid aggregator or flocculator for the treatment of water containing matters in a colloidal state. Such matters settle in water very slowly and if they are to be quickly removed from the stream, they must be brought together into masses or flocks which will settle quite rapidly.

Either chemicalization or the described aeration may be employed; but it is the purpose of the present unit to accomplish the work more cheaply. To such end, a bed of gravel or the like 52, is employed. The gravel is supported by a coarse screen 53 considerably below the water level WL, and fixed between the side of the tank and a longitudinal partition 54. Obviously, the gravel bed is of great extent with respect to the working area of the inlet ports 5 and yet, the water passes downward therethrough with sufficient force to impact colloids upon the surfaces thereof. Colloid films are thus formed upon the smooth surfaces of the stones, and such films and masses become dislodged and pass downward through the coarse screen, entering the slow motion cross-flow portion of the unit where they settle, as do other solids. The water then moves upwardly and into the trough 55 and thence outward through the ports 5 in the downstream side of the unit.

The basic unit detailed in Figs. 30, 31 and 32 (Sheet 11) is devoted to the aggregation and the flotation in drop-like form of oil particles entering with the water through the port 5. Downward flow is here ensured by the presence of the adjacent baffle 57 and the water can reach the outlet trough 58 only by passing upward through a bed of gravel 59 which rests on a coarse screen 60. It will be noted that the bed of gravel is well below the water surface WL and that the outlet slot 58' is protected by a floor baffle 61 which covers part of the gravel bed. The gravel 59 presents rounded surfaces of great extent to which ascending oil particles are attracted. Gathering thereon, the oil particles finally form films and these, ascending with considerable promptness, leave the upper surface 59' of the gravel bed in the form of drop-like masses which, upon reaching the surface WL, spread thereon, while the water turns laterally at velocities which do not entrain or prevent the rise of such oil; the clear water finally leaving through the outlet channel 58". The float or scum of oil is discharged from the surface WL through the scum hole 3a in the end of the unit.

An access space 62 is provided at the end of the unit. The bed 59 is composed of stones from ¾ to 1½ inch size. Neither of the gravel beds shown on Sheets 10 and 11 ever serves as a filter. The gravel is not intended to retain anything but merely serves to bring small particles together and present them as masses which may be then readily separated from the water.

The basic unit illustrated in Figs. 33, 34 and 35, also Figs. 34a and 35a (Sheet 12) contains special internal parts and is provided with a vertical extension 67, together adapting the unit to be employed in the aeration of the water to the end that oxidizable substances shall be consumed, modified or oxidized, in the manner previously recited. The added parts will first be explained, after which the several operations will be described. The water level in this unit is substantially the same as in the others.

The principal internal element here added is a rotor 63 or rotors, installed opposite the inlet ports 5 in position to dip slightly into the water. The rotation is in the direction of the arrows appearing in Figs. 33 and 46 and thereby water is thrown upward in the form of spray, as before mentioned and as indicated by the arrows 64 in Fig. 33. Thus the water is quickly aerated.

As before stated, all of the water is thus thrown into the air and to enable such action, the rotor is placed within a longitudinal trough 65 formed by the baffle 66 and having a bottom portion 66' which joins the side of the unit. Clearly, the incoming water, to progress, must be elevated from the trough and thus pass to a downstream position.

The superstructure erected upon the basic unit comprises sides 67 and ends 67'. As shown, both top and bottom of the superstructure are open, and additional openings may be provided, to freely admit fresh air. The superstructure rises to a height greater than that attained by the spray, so that wind shall not carry the spray away. In falling, the spray strikes the downstream wall 67 and the inclined or stepped deflector 68, by which latter the water is formed into a cataract or cascade to be further aerated before it falls into the basic unit. The latter contains a baffle 69 and a trough 69', both shielded by the overlying part 68. The falling water strikes an inclined floor 70 and the submerged shelf 71.

Both parts 70 and 71 extend the full length of the unit; and, thereby the falling water is kept from plunging into the relatively quiet water in the lower part of the unit. In consequence, the water leaves the shelf in the direction of the arrows 71' and takes on a relatively slow, circulatory motion in the lower part of the unit. As before explained, the aeration of the water often results in the formation of soapy foams, particularly in the instance of sewage, and such foams are in this manner quietly left upon the surface WL beneath the raised floor 70, thence to be discharged through the scum hole 3a. Unconsumed solids, mainly the ash of oxidation, settle quietly in the lower part of the unit while the well aerated water passes upward into the space 69' and is discharged through ports 5 in the downstream side of the unit.

As well shown in Figs. 34 and 35 and in detailed Figs. 45 and 46 (Sheet 15) the rotor employed in the aeration process resembles the before described rotor 11 but in practice the discs 63' are of smaller diameter and are arranged in groups. Specifically, the discs 63' perform best when separated by ¼ to ⅜ inch spaces. Narrower spaces tend to cause the discs to expel unnecessarily coarse spray.

It might be thought that devices of this character would be inefficient water elevators but the contrary is true, for the discs are merely filmed with water and they are rotated easily at speeds which centrifugally detach the water films. And the detached films naturally break up into very fine particles, thus affording intimate contact between the air and the minutely subdivided water.

The reason for arranging the aerator discs in small groups as shown is that a greater number of discs is not required and it is desirable that air spaces shall be left between the groups to ensure free circulation of air within the aerating chamber 67a. In lieu of external louvres, an internal partition 67b may be provided. Thus an air channel 72, open at top and bottom, is provided for the delivery of fresh air to the lower part of the superstructure. Other means may be employed to the same end. An access door 73 is provided in one or both ends of the superstructure and, if desired, these may be left open, or comprise louvred gratings.

The floor portion 66" of the trough 65 is provided with several openings 66' to which later reference will be made. The dotted lines 66a represent a door or doors for normally closing such openings but adapted to be opened, as later explained.

By preference, the rotor groups are mounted in pairs upon a tubular member 74 (see Figs. 45 and 46). The tube, in turn, is mounted upon the rotor shaft 75 and is locked thereon as by one or more set screws 76. By this construction, it is made possible to put several pairs of rotor groups upon a single shaft 75, and that shaft is held in anti-friction hanger bearings 77 and is rotated by a direct-connected motor 78. Because of the length of the basic unit, it is preferable to divide the shaft into two parts and employ two motors 78, as well shown in Figs. 34 and 35 and in Figs. 2 and 4.

The units as thus suited to different steps of the process will at once be recognized in the assembly views, Figs. 1, 2, 3, 4, 5, 6, 10, 11, 12 and 13 and little need be added thereto by way of special explanation.

Figs. 1 to 3 illustrate a system especially adapted to the treatment of sewage or other water containing a burden of organic matters. An initial oil treatment unit is followed by a sedimentation unit, a colloid collecting unit, an oil collecting unit and two aeration units. Such an operation ensures an effluent of high character. The handling of the sludges from such a system has been explained. The before mentioned openings 66" with valves or doors 66a appear in Fig. 3. It is sometimes desired to stop or shut down the aerator rotors 63. At such times the flow through the system may be continued by merely opening the doors 66a and allowing the water to undulate in the basic units and to bypass directly to the outfall box 79.

The treatment system illustrated in Figs. 4 to 6 is appropriate to water of any kind. It comprises an influent connection 80 followed by two sedimentation units, then an oil recovery unit, a sedimentation unit, a colloid collecting unit, a sedimentation unit, two aeration units, and a final sedimentation unit 81. The latter is raised, to take advantage of the elevation of the water by the last aerator. It presents an outfall 82 which is higher than the influent 80. This is frequently advantageous. The part 84 shown in Fig. 5 is a short circuit or bypass outfall used when the rotors are stopped. In the system having the elevated effluent, some water is returned to the tank beneath and the openings 66' are constantly open. Whether the bypass is used depends merely upon the level maintained in the basic tank. The bypass outfall is slightly higher than the level maintained when the rotors are in operation. The stopping of the rotors and a slight rise of level causes water to spill through the bypass ports.

No oil treatment is employed in the system of Fig. 4 but instead, the use of oil is limited to the treatment of the sludges taken from the system or group of units. The sludge treating operation is conducted in a horizontal unit 83 or in a tower-like separator, to both of which later reference will be made.

The system of Fig. 10 comprises a screen equipped influent channel followed by four sedimentation units, appropriate to the treatment of certain waters.

Fig. 11 begins with a sedimentation unit and includes an oil contacting unit as well as colloid and oil collecting units and aeration units, all of which will now be clearly understood.

The system of Fig. 12, particularly adapted to the treatment of relatively good water, comprises three sedimentation units, two aeration units and a final sedimentation unit.

The system of Fig. 13 is specially adapted for use upon waters which require prompt aeration as well as terminal aeration. That system therefore, is distinguished by the early introduction of an aeration unit; followed by two sedimentation units and a two-stage aeration unit 86 having an elevated effluent box 87. The scum skimming slot 88 serves for the discharge of the soapy scums, before mentioned.

This invention is not limited to an arrangement of treating tanks or units in cross flow relation. To make this clear, attention is directed to Figs. 14, 15 and 16 and to Figs. 63 to 80 which illustrate the invention as adapted to the longitudinal flow of water through the basic trough-like units. Incidentally, such parts of the drawing contemplate complete or finished treatments of foul water and comprise primary sedimentation and levitation followed by aeration and final sedimentation. Such drawings also provide for separate sludge disposal, as will be explained.

In such cases as are depicted in Figs. 14, 15 and 16 groups of units, 89 and 90, may be arranged end to end, separated only by a working space 91. Water, entering through an influent connection 92, moves slowly through the units 89, depositing solids and exhibiting scums therein. Bottom sludges are discharged through the now familiar parts 4 and 9 and a common header 31x and by means of a pumping and mixing column C (to be described) are transferred to an adjacent sludge tank 93. Scums which collect upon the surface 89' gather against cross baffles 89" and drop into outfall boxes 3cx through skimming slots 3ax. The header belonging to the several scum boxes is marked 33x. A pump D serves to transfer scums to the tank 93.

The clarified water from the tanks 89 rising behind the baffles 89" and passing through holes 95 in the ends of the units, enters the short horizontal troughs 96. The latter bridge the space 91 and operatively join the two groups of units 89 and 90.

A water tight deck or floor 97 rests upon the tops of the units 90, extending from side to side and longitudinally to a point 97' near the distant end thereof. The aerator elements 63v, 63w, 63x, 63y and 63z are like those previously described, functioning in the same manner. These discs are arranged upon respective drive shafts properly borne and equipped externally with respective motors 78v, 78w, 78x, 78y and 78z.

A windbreak or superstructure 98 open to the air, is erected at the margin of the deck 97, also at the sides of the group of troughs 96. Low vertical flanges or blades 99 extend across the deck 97 and divide it into shallow transverse troughs, one for each rotary aerator. These, in turn, are divided by higher inclined flanges 97x, one close to each rotary element. The inclined parts 98' are cascade partitions, functioning like those previously described; one for each rotor except the last. The partitions are spaced above the deck so that water may flow from one trough to the next, down-stream.

It will be noted that all troughs are shallow, including the troughs 96. These shallow depths are essential in order that movement of water therein shall be sufficiently rapid to prevent the deposition of residual solids. Being shallow, they are virtually self-cleaning.

By means of the groups of aerator discs 63v which dip into the water in the troughs 96, the water is elevated therefrom and delivered as spray upon the elevated deck 97. The other aerator elements 63v, 63w, 63x, 63y and 63z being similarly disposed in the transverse troughs upon that deck, serve to repeatedly spray the water into the air, finally delivering it at the point 97'. Accumulated scums are discharged through slots 98x, one for each deck trough, and are delivered to the sludge tank 93, as well shown in Fig. 15.

Arriving at the end 97' of the deck, the water falls upon the shallow troughs or plates 71x and is thus gently distributed in the units 90. Residual scums thus delivered upon the surface 90' of the water in the units 90, are removed, as through skimming troughs 90", properly aligned and serving to deliver same to the header 33x. Obviously, the water upon leaving the plates 71x, moves slowly toward the opposite ends of the units 90, as indicated by arrows in Fig. 14. During such slow motion, substantially all residual solids are precipitated; and such solids are discharged through the working of the trough elements 4 and 9, reaching the sludge tank 93 through the header 31x. The finally purified water leaves the units 90 by way of the outfall boxes 101 and the outfall duct 102. (See Figs. 14 and 16.)

The transfer of sludges and scums to the sludge tank 93 by means of the pumping elements C and D and the treatments conducted therein will soon be made clear.

Attention now turns to Fig. 17. Little further description is required. Longitudinal flow units 103 deliver the partially treated water to the first of a laterally positioned group of aeration units 104. All operations and mechanical details will be understood from the foregoing descriptions. The influent and effluent connections are marked 105 and 106, respectively. Sludges are here cared for in a separate tank 93x.

Figs. 63 to 80 to which brief reference has been made, will be described in detail hereinafter. At this point attention reverts to the matter of separating and reducing watery sludges and disposing of them.

Hereinbefore it has been made plain that the marked affinity existing between a light mineral oil and organic matters in water, may be employed initially in the stream to be clarified; or in a more limited but equally important way, employed to first segregate and then concentrate in a readily combustible form the organic matters present in watery sludges and scums taken from a water purification process and ordinarily most difficult of either convenient or final disposal. This use of oil with sludges, also serves to cleanse and finally separate both the water and the inorganic solids, rendering them innocuous when discharged from the system.

Both procedures thus employing oil will be found to be of much practical importance when contrasted with the more expensive and less reliable practices now in vogue. The first procedure has been fully described; particularly in relation to Figs. 1 to 3 and 18 to 20. The second, which may be termed an external treatment of sludges and scums, is variously exhibited in Figs. 4 to 9, 14 to 17 and 49 to 52.

By preference, such external treatment of sludge is conducted in an added horizontal unit or tank having the makeup already accorded the basic units of this system. Such an added unit is marked 83 in Figs. 4, 6, 7, 8 and 9; 93 in Figs. 15 and 16; 93x in Fig. 17; and 93 in Fig. 49. Each tank contains a body of water and a body of oil floating thereon. The watery sludges and scums from the purifying system are delivered into the oil in such tank and inflow and outlet arrangements therefor will be defined.

Where the tank can be placed at a lower level than the system units, the hydraulic head provided by the system and under the control of the sludge valves described, will provide for the transfer of sludges through suitable pipes. But it is generally more convenient to place the sludge tank upon the same level as the rest of the system and the transfer of sludges from system to sludge tank is then to be accomplished by means of suitable pumping devices arranged to draw from the system units and deliver to the sludge unit or tank. The horizontal sludge tanks are so depicted in the drawings.

In either case, whether at the same or a lower level it is essential that the sludges and scums issuing from a purification system shall be thoroughly admixed with oil either within or before entering the tank and, further, it is essential that the mixture shall thereafter be allowed to settle and separate by gravity. Rotary discs as shown in Figs. 1 and 18 may be employed to mix oil with the entering sludges. But as the volume of sludges and scums is small, it seems better to mix them in a separate device, C, which is placed in the line between the purification system and the sludge tank. The device, C, shown also in other figures of the drawing, is a combined pump and mixer so that it may serve to exhaust sludges, and, if desired, scums from the system and vigorously mix them with oil as fast as they are exhausted.

As shown in Figs. 49 and 50, the several sludge discharge valves belonging to the purification system are joined to the mixer, C, as by a pipe or duct 107. The device, C, comprises a foot piece 108 and a tubular column 109 rising therefrom and at its upper end fitted with a tight cap and a driving motor 110. The inlet passage 108' within the foot piece is also joined by a pipe 111 through which oil is continuously supplied. In consequence, the parts 107, 108' and the interior 109' of the column are constantly occupied by oil, ready to receive charges of dirty waste waters from the main system. A motor driven shaft 112 extends from the motor 110 to a bearing 113 in the foot piece. On this shaft is a centrifugal impeller 114, the interior of which is in communication with the inlet space 108'. The impeller 114 opens into the lower part of the casing or column 109 and, when rotated at high speed, serves to draw sludges and oil from the foot piece and to displace in upward direction the contents of the chamber 109'. By such slow whirling advance the sludges and scums supplied with the oil are intimately admixed. That mixing is amplified by opposed dashers or propellers 115, 116 which are provided on the shaft 112.

The well-admixed watery sludges and oil leave the top of the chamber 109' through an outlet pipe 117, or directly through the open top of the column 109, as shown at 117' in Figs. 7 and 8. The position and connections of the device, C, are more fully represented in Fig. 49. As there shown, the oil pipe 111 leads from the screen box 111' situated in the upper part of the oil body, O, within the sludge tank 93. A valve 111a is provided for controlling the flow to the foot of the mixer. The mixture discharge pipe 117 leading from the upper part of the device C extends into the oil body, O, and opens against a spreader plate 118 situated therein. The purpose is to avoid violent action within the oil body O.

The scums drawn from the system, though accompanied by considerable water, are very light and may be safely discharged directly into the oil body in the sludge tank. Hence Fig. 49 illustrates a centrifugal pump 119 for such purposes. However, the scums with better effect may pass through the mixer as suggested by the header connections 31z of Fig. 22.

Incidentally, Fig. 49 illustrates an oil contact unit of the kind shown in Figs. 24, 25 and 26 and devoted to the use of oil in the purifying system itself. In such cases there is a constant flow of oily sludges from system to sludge tank; and there it is desirable to return fresh oil to the body 48 beneath the perforated plate 46, of the system unit. Hence the employment of the centrifugal pumps 120 by which relatively clean oil from the screen box 111' is transferred to the standpipe 49 of the system unit. Fresh oil as required is supplied, preferably through a pipe 121 leading into the sludge tank.

Organic substances which are engaged by the oil are, nevertheless, heavier than the oil and quietly settle in the oil body, O. At the same time accompanying water and also solids of an inorganic nature, pass downward through the interface 122; and quietly settle in the lower part of the tank. The settled solids are discharged through the working of the now familiar parts 4 and 9 belonging to the unit which serves as a sludge tank.

Excess water leaves the tank through the vertical baffle space 123 and an overflow pipe 124. In practice, the water from this pipe is returned to the influent of the purification system. Excess, heavily befouled oil, called oily sludge, leaves the tank through the vertical baffle space 125 and an outlet pipe 126.

As indicated in Fig. 49 the heavily oiled sludge may directly enter the combustion furnace 127 or it may pass through any suitable filter, such as the device 128, whereby the well oiled organic solids are more densely prepared for combustion in the furnace 127; while filtered oil accumulates in the lower part 129 of the filter, to be disposed of separately, or to be returned to the oil body, O, in the sludge tank.

The oily sludge or "oil sludge" produced by this invention is suitable for use in internal combustion engines and may be so employed for the direct development of power.

It will be apparent that by means of these operations, which comprise the making and treatment of watery sludges and scums, such wastes are quickly divided or converted into three readily disposable parts. First: the organic matters admixed with oil and, therefore adapted for final disposition by quick combustion, filtration or distillation; second: the separated water, which preferably is returned to the influent of the purification system; and, third: the inorganic (ashy) matters, which are nonputrescible and disposable at will. This quick division is of special sanitary and economic importance for thereby great savings are ensured.

Obviously, the putrescibles, plus the accompanying oil, are of small volume and are virtually free from ash, a matter which greatly simplifies both combustion and distillation. Another advantage is that no other means are required for dehydrating sludges which are to be burned in furnaces or engines. Further, the matters are separated from the watery wastes and prepared for either combustion or distillation without an expenditure of heat as in some present systems. And further, such preparation is made to take place very quickly, as compared with the work of the slow sludge digestion systems and drying beds now in use.

All that has been said concerning the sludge tank of Fig. 49 is equally applicable to a tank 83, made in the preferred manner depicted in Figs. 7 to 9 and associated with the purification systems of Figs. 4 to 5. The operation of the sludge tank 83 is the same but certain mechanical improvements and modifications may be pointed out, as follows: First, it will be seen that the combined suction pump and mixer C, before explained, is here directly incorporated with the body of the sludge tank 83 and that its top opens directly into the body of oil therein. The motor 110a is here supported by struts 109a, rising from the top of the column or casing 109. Further, the relief channels of this tank 83 are provided with the outfall ports 130 and 131, respectively, for excess water and oil sludge. Convenient outfall boxes 130' and 131' are provided.

In lieu of the filter shown in Fig. 49 it is here preferred to employ one or several oil-sludge settling columns 24a; identical with the previously described columns 24 of Figs. 1, 2 and 3 and whereby the organic solids may be further consolidated before they are withdrawn for use or destruction.

Attention now turns to Figs. 51 and 52, illustrating sludge treating apparatus of a modified form. These are presented for the purpose of showing that sludge disposal hereunder is not limited to practice in the precise manner set forth with reference to the horizontal sludge tanks 83 and 93. Instead, the final intimate admixture of settled and floating sludges with segregating oil may be postponed until the watery sludges and scums taken from the system are first segregated to an extent which permits an immediate return to the system of the greater part of the water that served to convey the impurities from the larger system.

The chief novel elements here comprise a capacious tower-like sludge separator, E, and a smaller sludge mixer F. The latter resembles the mixer C previously described but need not function as a pump. The tower E has a base portion 132 which forms a raw sludge sump 133.

By preference, the tower rises from a level 134 which is lower than the level or base 135 upon which rest the units composing the purification system 136. This being the case, the sludges and the scums from the headers 31 and 33 of that system may be discharged by gravity and into the sump 133, as represented by the pipes 137 and 138.

A motor driven centrifugal pump 139 is provided for withdrawing sludges from the sump 133 through pipe 138 and that heavily burdened liquid is transferred to the interior of the tower through a discharge pipe 140 leading from the pump 139 to the interior of the tower. The pump operates intermittently under the control of the float actuated electrical device 139'. A suitably baffled outlet 140' is provided at the open top of the pipe 140 and a proper check valve 141 is placed in the lower part of the pipe 140.

The tower contains a body of water 142 and a body of oil 143, and the liquid discharged from the pipe 140 separates in the water 142. The heavier solids sink to the bottom of the tower as indicated at 144, while the floatable and oily matters rise into amalgamation with the oil body 143. A conical tower bottom 145 ensures free discharge of settled solids through the valved pipe 146 which leads into the mixer F.

The upper part of the tower contains a large cylindrical part 147, open at the bottom and into which the oily matters rise. Quietly stratifying therein, the organic matters collect at the bottom of the oil body 143 and rise into the annular space 148, displacing the water in the latter. Gravity cleared oil is returned to the system 136 through a pipe 149 which leads from the upper interior of the cylindrical part 147.

Gravity cleared water is returned to the system through a pipe 150, working through the medium of the parts 151 and 152. The part 151 is open at the top and is no more than an outfall box. The part 152 is a water outfall pipe or duct which, being open at a point well below the oil body 143, leads water upward into the part or box 151 at a level above the interface 153 and compensating for the column of oil above that level.

The open box 151 is used as a syphon air break, to prevent syphoning of water by the pipe 149. Except for the box, the top of the tower may be closed by a cap, f; but gases, if any, are freely discharged through holes, e, in the upper part of the box 151.

An oil sludge pipe 154 having a valve 155 at its lower end, conveys oil sludge from the space 143 in the tower to the mixer F. The latter is distinguished by a motor driven propeller shaft 156 and a plurality of propellers or mixing blades 157 thereon. The mixer has a conical bottom F' and is provided with a valve discharge pipe 158.

Bottom and top sludges are taken from the tower through pipes 146 and 154 and, having been mixed, are permitted to stand until a separation of oily sludge 159, of water 160 and of inorganic matters 161, takes place, as represented in Fig. 51. 162 represents a device by means of which a coagulating chemical may be introduced before the sludges are mixed and to further the clarification of the water 160.

The operation of the mixer may be recited as follows: Beginning with an empty mixer, that container is first filled with oil sludge until such sludge begins to flow from the test cock 163. That valve controlling the test cock 163 is then closed and bottom sludge is permitted to fill the mixer approximately to the level of the test cock 164. All valves being then closed, the motor is started and for some minutes the oily and watery sludges are violently mixed, stirred or agitated and thus brought into contact within the mixer. The transfer of organic matters to the oil is thereby accomplished. The motor is then stopped and the mixture is allowed to settle or stratify, as here shown. Thereafter, under the control of the valve in pipe 158 the several components are discharged separately, as into respective containers 161', 160' and 159'. A furnace 165 is provided for burning the oil sludge from the latter. If desired, the inorganic matters from 161' may be transferred to the furnace and there additionally sterilized.

To reiterate, an important principle of this invention relates to the solids that settle in the tanks comprising a purifying system and requires that they shall be discharged before they gasify and cause solids to ascend, which would result in recontaminating the stream. The principle also requires that sludges be discharged in small quantities, in other words, either continuously or frequently, to avoid stagnation; and that discharge shall be managed with little water, lest the burden of water prevent reasonably easy "recovery" or the separation of the sludge constituents that must be gathered or destroyed if the process as a whole is to be regarded as accomplishing the kindred ends of sanitation and economy.

It is difficult to observe this principle in any plan which involves infrequent collection and discharge of sludge. Every such method entails relatively long retention of sludge and if organic solids are involved, risks recontamination of the stream; and every continuous method thus far devised discharges merely dirty water, rather than a reasonably gathered sludge, making sludge disposal very difficult. By this invention, sludge collection and discharge are made easy and much less water is wasted in getting rid of the settled solids. These matters will be understood from the descriptions applying to the trough-like bottoms, the so-called sludge rails and the valved sludge outlets. But it is to be clearly understood that the invention is not limited to such as have been detailed thus far. Hence, special attention is now directed to Figs. 53 to 80 which illustrate other novel structures which possess added advantages.

Instead of employing the slotted tube 4 to join the lower edges of the trough sides, 2, those edges are directly united, either by rivets 166 as shown in Figs. 53, 54 and 55, or, by a longitudinal autogenous weld 167, as shown in Fig. 56. In either case, the trough is provided with a sharp V-bottom 168. As sludge cannot be easily displaced from a sharply bottomed trough, the bottom of this unit is made to contain a filler 169 (also see Figs. 59 and 73) and thereby is provided with a narrow flat floor 170, from which the settled solids may be easily dislodged.

The filler 169 may be made by pouring molten lead into the bottom of the trough; or, melted coal tar may be used for the purpose, or a shaped metal bar may be used, as in Figs. 59 and 73. Usually a number of spaced lugs 169' (weld spots) will be provided on the inner surfaces of the sheets 2, to interlock any soft filler so that it cannot be dislodged. The metal bar of Fig. 59 is inertly embedded in tar or cement.

The movable rail or element R (see Figs. 53 to 56) is made of larger diameter than the before described rail 9 and when it rests upon opposed slanting sides 2, 2 of the tank, a longitudinally extended space R' remains between the bottom of the rail R and the trough bottom 170. An opening 3r is made in one tank-end 3 and through that end the sludge is discharged in the "gun barrel" manner before described.

In this case the valve 8 comprises a simple welded structure having a flange 8e', applied directly to the end of the tank. Novelty will be observed in the valve bushing 8f which provides the seat for the valve ball 8c.

No cleanout hole need be provided in the other end of the tank because the whole bottom is readily accessible when the rail R is raised as shown by dotted lines in Fig. 55.

The rail is of novel construction: A heavy walled tube or pipe 171 is provided with a sharply slanting roof 172 to prevent an accumulation of solids on its top. The roof pieces 172 are attached to the pipe 171 by spaced welds 173 and their downwardly projecting edges 172' serve to hold respective rubber contact strips 174. The lower edges of the strips 174 are held by a clamping strip 175 which is secured to the under side of the pipe 171 by bolts 176. The spaces beneath the roof 172 and within the pipe 171 are closed by ends 177 and 178 welded therein. Most conveniently, a cross strip 179 is employed upon the end X of the rail for engagement with the inner side of the tank end 3. As before, the rail is suspended, raised and lowered by means of the rods or cables 9a and the latter are slightly pitched to cause the weight of the rail to hold it against the tank end at X. The structure here described has the advantage of being easy to assemble and to keep in order. Yet its net weight when suspended in water is little enough to make it easy to operate.

While the sludge rails 9 and R are simple and effective they typify an intermittent discharge of settled sludges. The invention is not limited thereto; and in several respects may be improved by the use of means which admit of continuous sludge discharge, whether operated continuously or intermittently. Several continuous discharge systems are therefore illustrated in Figs. 57 to 66, and will be described in sufficient detail to disclose the novel principle upon which they are based. All are primarily intended to convey freshly settled solids. The organic solids of sewage, here chiefly concerned, are but slightly heavier than water and when fresh never settle and pack into dense masses, and therefore may be moved with little effort.

Under this invention the solids are allowed to settle in the slowly moving water and then an under-water current is created to slowly move the settled solids toward and through an opening in the end of the trough or tank unit.

Referring to Fig. 57, the said opening in the end of the tank is marked 180. This opens into a novel settling pocket 181. The top of the pocket rises above the water line 182 and obviously sludge may accumulate in the bottom of the pocket, and even gasify, without danger of contaminating the liquid in the main tank, whether the flow in the latter be lateral or longitudinal. This removal of sludge from the main stream is a feature of much practical importance. Next, it will be noted that the dirty water occupying the bottom portion of the tank is set into slow motion toward the opening 180, as by a pumped stream or streams of water directed into the trough bottom by one or more jet nozzles 183. The slow circulatory movement of the water thus created lengthwise in the trough accomplishes the slow conveyance or propulsion of the solids without disturbing the movement of the main stream and without interrupting the sedimentation taking place therein.

Fig. 58 discloses an opening 180a which communicates directly with a sludge discharge pipe 184. The latter may be the header 31 before described or as here shown, may merely provide for the constant hydrostatic discharge of watery sludge into a pocket 185.

The tank unit of Fig. 57 is of the lateral flow type as indicated by the familiar openings 5; whereas the unit of Fig. 58 is of the longitudinal flow type; as indicated by inflow connection 186, the cross baffle 187 and the outfall connection 188 and its baffle 189. The parts 190 and 191 are inclined bottom portions suited to the ends of the tank as an aid in controlling the end-to-end circulation, which, as described, initiates in the bottom of the tank.

Clearly, the tank equipments depicted in Figs. 57 and 58 are applicable to any and all of the tank units herein depicted.

The before mentioned supporting cradles, Z, for the unit are well shown in Figs. 54 to 62. By preference, these cradles are of welded construction and in each case rigidly attached to the tank bottom. By preference, also, the cradles are made narrower than the tank or unit and the end plates 3 are cut back at the bottom, as shown, to make room for a man to enter the spaces between adjoining tanks.

As indicated by Figs. 59 to 62, the bottoms of the troughs may be variously shaped and yet suit the described under-water current and movement of sludge. Fig. 59 has been described. Fig. 60 illustrates a bottom which has a narrow trough-like downward extension 192, the top of which contains a relatively narrow slot 193 through which the descending solids settle into such gathering trough or channel. The trough of Fig. 61 has a relatively wide, flat bottom 194 to receive the sludge and that bottom is partly covered or roofed by an inverted V-shaped fixed trough or hood 195, having sludge slots 196 at its sides. The sludge which settles below the covering part is slowly displaced by the movement imparted by the water jet, or like means. The tank bottom of Fig. 62 likewise comprises a trough portion 197 but that part is offset so that a single cover section 198 suffices. That cover section and the restricting parts 198' of Fig. 60 are arranged to be removed at will, to afford access to the troughs. This is specially desirable when mechanical sludge devices are installed in bottom extensions, like 192, 194 and 197. Obviously, any of the trough bottoms may contain slowly rotated spiral conveyors or more rapidly rotated bladed propellers. While not as satisfactory, either will cause the required end-to-end slow movement of the dirty water. Such devices do not require illustrations and are not herein shown.

Figs. 65 and 66 disclose still other means for creating the described end-to-end movement of the dirty water in the trough bottoms. This last comprises a chain belt 199 having numerous cross flights 199' that drag along the V-shaped bottom of the trough. These move very slowly and do not agitate the settled sludge but merely move it quietly toward and into the sludge reception pocket, 181b, through the opening 180b, at the end of the tank. Such equipments are specially desirable where the settling solids are heavy; for example, when handling sand, blast furnace dust, or the like. Further details will appear hereinafter.

Attention is now directed to the invention as depicted in Figs. 63 to 80. These disclose some features not hitherto described and yet applicable to all forms of this system. Further, they present a system which is adapted for the complete treatment of sewage and all matters of final disposal. Nevertheless, this particular system is of small size and of such low cost that it is particularly adapted to sewage volumes ranging from one to five hundred thousand gallons per day; in other words, as needed by small towns. Clearly, the invention is not limited to given widths or depths and may be enlarged to suit greater demands. However, it is preferred that an enlargement shall be attained by multiplying the number of such unit systems. Obviously, that may be done without departing from the described standardization which allows quantity production and affords ease of transportation.

As well shown, the system unit is of elongated, rectangular form; comprising four longitudinally extended trough-like units placed side by side. Each trough may comprise two or more standard (shippable) units, joined end to end. Four such troughs are shown. Two are sufficient for a small demand and the number may be increased, as required to afford the width needed to treat larger volumes.

A longitudinal partition 200 divides the group of parallel troughs into two main compartments. Such compartments are marked 201 and 202. The liquid enters through an influent pipe 203 at the end of the compartment 201, fills that compartment and very slowly flows to the other end thereof. The liquid is there transferred to the adjacent end of the parallel compartment 202 and therein flowing in the opposite direction, is discharged into an outfall trough 204 (see Figs. 63, 66 and 69). The body of each compartment is devoted to sedimentation and to levitation in the manner before described. The other steps of the process are performed at the ends of the compartments, being superimposed thereon. The lengths of the compartments are shorter than usual; shorter detention periods becoming adequate by reason of the efficacy of the superimposed steps of the process. In the main the latter are the same as before described save that the colloid collecting and oil collecting devices have been omitted from Figs. 63 to 80. These may be added when required.

The drawings (particularly Figs. 63 and 65) illustrate the system as taking coarsely screened sewage from a pit or sump 205, a centrifugal pump 206 serving to raise the liquid to the influent pipe 203. In this case the sewage is intimately admixed with mineral oil before it enters the compartment 201, it being desirable to accomplish the transfer of organic matters to the oil as speedily as possible. By such transfer, however accomplished, the load or work to be done by the sedimentation tank is lessened.

Referring to Fig. 65, it will be seen that the intake pipe 206' of the pump opens below the surface of the raw sewage in the pit 205. Directly below but spaced from the pipe 206' is an open nozzle 207 belonging to an oil feeding pipe 207'. The latter is constantly supplied with oil and when the pump is in operation both sewage and oil are elevated from the pit 205 and are violently admixed in and by the pump before being delivered to the tank through the influent pipe 203. The part 208 is a regulating valve commonly used in the pump delivery pipe. The source of the oil for the pipe 207' wil be described later. The relation of the pipes 206' and 207' and the oil nozzle 207 is better illustrated in Fig. 75.

Another method of intimately admixing oil and sewage is illustrated in Fig. 76; this for employment where a sewage duct 209 is at about the level of the top of the sedimentation tank; a gravity-flow relation. A cylindrical chamber 210 contains a plurality of opposed beaters or propellers 211 arranged on a motor shaft 212. 213 represents the driving motor. A connection 214 joins the sewage duct 209 to one end of the cylinder 210 and an outlet connection 215 extends from the other end of the cylinder 210 to the sedimentation tank. Oil is supplied by a pipe 216, joining the connection 214. During operation, sewage and oil flow through the cylinder or body 210 and are therein intimately contacted or admixed by the action of the beaters 211. The mixture then passes to the tank through the connection 215. The advantages of such admixture have been explained and need not be repeated. This is a horizontal form of the vertical mixers shown in preceding figures.

In many cases such initial contacting of the oil with the organic solids of the sewage will be sufficient for the purposes of this invention. But in most cases it is both convenient and expedient to augment such contact in order that maximum quantities of organic matter shall be intercepted and virtually removed from the stream in advance of sedimentation. Less remains to be done in that step. To this end a body of oil 219 is maintained in the reception end of the compartment 201 and the sewage, whether or not premixed with oil, is dispersed in and passes downward through that body as before explained.

The body of oil floats upon the underlying water and is confined by a cross baffle 217, spaced from the end 3a of the tank. Normally the tank 201 is filled to the level 201a, that level being fixed by the height of the normal outfall at the opposite end of the tank (see the shallow, submerged weir trough 218 of Figs. 65 and 78). The cross baffle 217 extends well below the surface 201a and as the oil accumulates and displaces water, the lower part of the body finally reaches the level of the lower edge of the baffle 217, while the top of the oil body rises above the level 201a. The organic solids, intercepted by the oil, stratify in that body as before explained and the constant addition of oil causes heavily befouled oil to be displaced downward and to break out under the baffle 217. There the befouled oil rises and forms an oil scum upon the surface 201a. The entering water and the inorganic solids pass downward through the oil body 219.

To insure intimate contact between the entering sewage and the standing oil, a rotary mixer may be employed as shown in Fig. 1 but for simpler systems a perforated plate 220 is provided, as shown in Figs. 63, 65 and 68. This plate extends from the tank end 3a at a level which causes the plate to be submerged in the body of oil. The sewage passes downward through its perforations and is formed into many drops. Thus the area of contact is greatly increased with the results described in connection with Figs. 18 and 24. The part 221 is a splash plate opposite the influent 203.

As will be apparent, the perforated plate 220 serves also as a screen, catching the larger waste matters. The end of the plate slants upward and finally forms a perforated drain floor 220' above both liquid levels. Either by hand or by means of a driven belt conveyor 222 (see Fig. 65) the oil soaked screenings are collected in a cross trough 223 and are carried thence to the incinerating furnace 224, to which later further reference will be made.

Ordinarily, the oil needed to make up the floating body 219 may be thrown into the pit 205 and delivered to the compartment 201 by the pump 206. After it is formed the body 219 is maintained by the action of the mixing pump 206 with its oil feed, or by a more direct return of oil from the oil scum skimmer, about to be described.

The befouled oil, rising behind the cross baffle 217, moves slowly upon the surface 201a in the direction of the arrow 225 and falls into a deep skimming trough 226 which extends crosswise of the compartment near the far end thereof. The oil and the accompanying water are taken from the trough 226, preferably by a submerged pipe 227, leading back to, and through, the intake end of the tank. At that point the pipe 227 is connected with a small centrifugal pump 228 mounted on the end of the tank (see Figs. 63 and 65). That pump coacts with means which ultimately deliver purified oil to the sewage pump 206, or, into the oil body 219, as will be more fully described hereinafter.

A level edged plate 226' may be employed to fix the skimming level but by preference, that plate is higher and of a vertically corrugated shape, sharply corrugated as well shown in Figs. 78 and 80, and the scum outfall openings are quite narrow slots 226a which extend only slightly below the level 201a. In this way less water is wasted in discharging the oil scum and no flat walls are presented to interfere with the outflow of the scum.

The depth of the cross trough 226 precludes the escape of oil beneath it and only relatively clear settled sewage reaches the end of the tank for discharge into the before mentioned weir trough 218, or, directly outward from the tank, as next described.

Most conveniently, an outfall box 229 extends across both compartments 201 and 202, in the end of the tank. 229a represents the drain or final outfall duct of the system. Within the second compartment, 202, the box 229 has a closed top, as shown at 229b (Fig. 66), whereas in the first compartment the top of the box 229 is open, as clearly shown in Figs. 65, 78 and 80. It there presents a weir edge 229' which is higher than the edge 218' of the normal outfall trough 218. A wide upflow passage 230 is provided between the parts 218' and 229' and normally the liquid rises therein only to the level 201a. But when, for any reason, the level 201a is elevated, sewage spills directly into the box 229 over the weir edge 229'. In this way treatment may be limited to the compartment 201. However, at such times the shallow outfall trough 218 is always flooded and, if desired, much of the sewage may be taken away over that weir and may be thrown into the air as by a rotary aerating device 231 of now familiar form (see Figs. 65 and 78). Thus part may be by-passed and part aerated.

Normally, the level 201 is adhered to and as no sewage is then bypassed, it is necessary to transfer the whole stream of settled and aerated sewage to the second compartment 202. Final skimming and sedimentation take place in the latter. In making such transfer, opportunity is afforded for again aerating the sewage and for that purpose a second aerating device, marked 232, is provided in the second compartment.

Each aerator comprises one or several groups of thin discs having a common axis or shaft and all driven (through suitable gearing) by a motor 233. These devices operate as before described but are here associated with coacting parts, especially appropriate to the parallel sedimentation compartments 201 and 202.

The back of the shallow outfall trough 218 is formed by an inclined plate 234 and in the compartment 202 there is a like inclined plate 235. These plates give pitch direction to the spray from the rotors and if desired each thereof may have an adjustable pitch-control bar 236, as shown in Fig. 78.

The bottom, 218b, of the shallow trough in the compartment 202, is a continuation of the floor of the trough 218 but the two rotor troughs are separated by the partition 200 between the two compartments and by the housing 237 of the rotor gear, as shown in Fig. 79.

The plates 234 and 235 are backed by a trough 238 which extends across both compartments and the plate 235 contains a number of holes 235' through which the transfer trough 238 communicates with the shallow trough containing the rotor 231. The water sprayed by the rotor 231 falls into the trough 238 and passing along that trough, finds escape through the openings 235' and thus reaches the second rotor.

Within the compartment 202 the trough 238 has a cover plate 239 (see Figs. 66 and 78) and the spray in the second compartment falls upon that plate which serves to direct the treated sewage into the upper part of the compartment 202.

The liquid level 202a is preferably higher than the level 201a, for a reason about to be made clear. The plate 239 is positioned just below the level 202a and that plate as shown in Fig. 66 is wide enough to quiet the falling water and spread it evenly across the compartment 202. The soapy scums before referred to are there assembled and are thus quietly discharged upon the surface 202a for ultimate discharge through a skimmer trough 240 at the opposite end of that compartment.

Because the level 202a is higher than the level 201a it becomes possible to discharge the scum from the compartment 202 directly upon the surface 201a as through a trough opening 241 in the dividing wall 200. Thus the scums collected during final sedimentation and levitation are discharged upon the surface 201a and there join the hereinbefore described oil scum, to be finally removed through the skimmer trough 226.

Reverting to the aerators 231 and 232, it will be noted that open topped boxes 242 are erected upon the top of the tank as before, but a novel element is presented in the inclined cascade wall 243 of each said box. Such wall has deflecting flanges 244 and air entrance openings or slots 245 are provided beneath such flanges. The preferred construction is well illustrated in Fig. 78. The spray, which falls upon the inclined floor, cascades thereon and additional air is freely supplied through the openings 245.

As well shown, the scum skimming trough 240 is of the construction described in relation to the trough 226. And the before mentioned effluent outfall trough 204 is of like construction. Obviously, the latter determines the height of the level 202a. The trough 204 empties through an effluent pipe 246, which preferably is submerged in the compartment 202 and empties into the outfall box 229. Through this avenue the finished effluent is discharged.

The purification of sewage being now understood, attention turns to the disposition of the sludges and scums removed from the compartments 201 and 202. A sludge tank 247, much like that depicted in Fig. 49, is erected in and upon the end of the compartment 202. It has a bottom 247' which separates it from that compartment. Said sludge tank 247 contains a smaller inner oil sludge pocket 248 which is open at the top but has a closed bottom 248'. The sludge tank has its outlet pipe 249 and the smaller receptacle 248 has a discharge pipe 250. Both are suitably valved.

At the top of the tank 247 is a clean oil outfall or port 251 and at a lower point on the side of the tank there is a water outfall 252. The port or opening 251 leads into a downfall box 251' and from that box the before mentioned pipe 207' leads to the oil supply nozzle 207 belonging to the sewage pump 206. The port or opening 252 leads into a riser duct 252', open at the top, at a level slightly below the top of the inner pocket 248. Excess water is discharged through the riser 252' and falls into the oil-containing space of the compartment 201 (see Figs. 68 and 77).

The before mentioned centrifugal pump 228 has a discharge pipe 228' which leads upward and opens into the upper part of the sludge tank 247 at one side of the pocket 248 (see Figs. 63, 65 and 68). The pump 228 therefore serves to convey scums from the skimmer trough 226 directly into the upper part of the sludge tank 247. It is now to be noted that each of the bottom-sludge pockets 181b contains a sludge lifting pipe 253. These are in valved connection with the intake pipe 227 of the small centrifugal pump 228 and that pump is used for emptying the sludge pockets 181b. With this equipment, sludge separation and disposal are conducted as follows:

As a preliminary to operation, the sludge tank 247 is filled with water until water overflows from the riser 252'. The internal pocket 248 is not filled with water and as its top is slightly higher than the water level 252a established by the height of the part 252', no water enters the pocket from the tank 247. After the level 252a is established, the pocket 248 is filled with oil and the supply of oil is continued until the body 247a is built up and oil begins to spill out through the port 251 (see Fig. 66). The system is then ready for use in the manner described.

During operation of the system, oil scum is formed continuously and with its burden of organic matters, is withdrawn from the trough 226. The scum is accompanied by considerable water and the operation of the centrifugal pump 228 completes the transfer of organic matters to the oil. The mixture of water and foul oil enters the body of oil 247a at one side of the sludge tank and, due to the velocity of the entering stream, all the liquid in that tank is set into slow rotary motion. Obviously, the entering water, being heavier than the oil, sinks while the oil and organic matters are retained in the floating body 247a.

The organic solids settle in the oil until the surface 252a is encountered and build up on that surface. Then as the oil body 247a slowly rotates, the organic solids move over the open top of the pocket 248. The latter is always filled with oil and the organic matters settle and accumulate therein. Thus the organic matters are separated from both water and earthy matters and are collected in the relatively deep pocket 248. The heavily befouled oil is taken from the pocket 248 through the valved pipe 250 and this befouled oil is the "oil sludge" with which this invention is especially concerned. Clearly, the inorganic matters and the water are here automatically separated from the sludge comprising the organic matters. Objectionable organic matters are not only dehydrated but also charged with combustible oil. The inorganic sludge requires no special dehydration.

The excess water leaves the sludge tank through the riser 252'. The inorganic earthy matters are collected upon the floor 247' and are discharged through the valved pipe 249. In practice, the inorganic sludge is drained upon the floor 254 and the relatively dry, earthy matter may be taken from that floor or, if desired, may be incinerated in the furnace 224.

The oil sludge from the pocket 248 is, by preference, delivered directly to the furnace 224 and is there consumed and utilized with ease. The heat furnished by the burning of the oil sludge is ample for the incineration of all screenings and the inorganic grit.

Returning now to the matter of bottom sludges from the sedimentation units. It has been stated that the lift pipes 253 of the several sludge receiving pockets 181b are in valved connection with the intake of the centrifugal pump 228. Such connections and valves are best represented in Fig. 63. While the pump 228 is in operation and is conveying oil from the skimmer 226, any one or all of these sludge valves may be opened and then bottom sludge will be removed from the pockets 181b and, obviously, will be thoroughly and finally admixed with oil in the pump 228. Incidentally, any organic matters which chance to settle to the bottoms of the described tanks will be transferred to oil within the mixing pump 228, before discharge into the sludge separating and dehydrating tank 247.

From the foregoing it will be seen that in the system of Fig. 63 there are three points at which organic matters are definitely transferred from the sewage to the oil. First, the sewage and oil mixing pump; second, the mixing compartment containing the oil body 218; and third, the sludge pump 228. Finally, it is to be explained that the settlement of the organic matters in the oil body 247 results in leaving clean oil in the top of that body; and it is this clear oil which is returned to the sewage pump 206 through the box 251' and the pipe 207'.

Considerable quantities of oil make up the relatively stationary bodies 219 and 247a and in addition a quantity of oil is always in circulatory transit through the system, beginning at the sewage pump 206 and returning to that point.

Oil cannot be detected in the effluent of this system and such being the case, it is evident that the only withdrawal or waste of oil occurs at the sludge pocket 248. However, the oil-saturated sludge, withdrawn from that pocket is economically utilized in an engine, a furnace or a still and cannot be regarded as waste oil; but instead both such oil and all organic matters taken from the sewage may be always profitably employed.

Chemicals of various sorts may be introduced at will, wherever found desirable in the operation of any of these systems. Generally, coagulants and acid or alkali correctives may be best introduced with the influent liquid. Such chemicals as chlorine, for the destruction of bacteria, are best introduced near the effluent outfall of the system.

Mention has been made of the soapy foams that are derived from the action of the aerators of this invention and it is to be understood that this invention comprehends the introduction of foaming or coagulating matters capable of augmenting that action.

The use of chemicals may increase the bulk of the sludges and scums collected but cannot embarrass the operation of the system; for herein fully adequate means are provided for discharging collected matters in any volume.

Except in the case of the mixer F it has been deemed unnecessary to herein illustrate the means for introducing chemical substances. Such introductions and the tanks and pipes incident thereto may be contrived by anyone familiar with the work to be done. Likewise, it is deemed unnecessary to more carefully define the action of various chemicals, for each chemical must be selected with knowledge of the needs of the water to be treated.

In the operation of this system, detention periods and temperatures are to be noted chiefly with respect to the sludges deposited in the tank units. They should be discharged before gasification thereof begins if recontamination is to be completely avoided. The easily operated sludge removal means of this invention are of special moment in this connection; as well as for the effect they have upon the dominating design of the system as a whole.

So-called remote control and automatic operation may be applied to any of the movable elements of this invention. The application of such control systems is so well known that it has been thought unnecessary to illustrate them.

Ordinarily these systems will be housed; in order that they may be worked conveniently in all weathers. No other reason exists for housing them, for as will be found, the operation of this system is in no way unsightly and is virtually odorless.

The limited number and extent of pipes required for complete treatments under this invention should be noted as another of its advantages.

A further matter of note is that the burning of oil sludges hereunder is intended to furnish the means for consuming screenings, ordinarily difficult to dispose of. This is a particular convenience in the case of the oil soaked screenings taken from the herein described system. Grit may be incinerated at the same time.

Finally, it is to be noted that each of the products of the hereinbefore described process is important. First: A highly purified water is produced and, if desired, such effluent may be so far aerated as to contain dissolved oxygen in abundance; second: There is produced a valuable consolidation of mineral oil and putrescible matters; the latter ordinarily dangerous but here safely and odorlessly held in the oil, and ideally suited for disposition in any of the ways herein prescribed; and, third: The invention produces well cleansed inorganic matters. Being clean, such non-putrescible matters may be disposed of safely and with little effort.

Many older processes and apparatuses have been identified herein for sake of contrast herewith but have not been described in detail.

What I claim and desire to protect by Letters Patent is:

1. Screening a burdened stream of water and washing the screenings thereby separated from the stream of water with a mineral oil lighter than water, thereby retaining organic substances in such oil for disposition as oil sludge and deodorizing and preparing the washed screenings for combustion.

2. Forcibly and intimately admixing watery sludge from a water purification system with oil having affinity for organic matters and lighter than water; maintaining a relatively quiescent body of oil upon a relatively quiescent body of water; discharging the mixture of watery sludge and oil into the said quiescent body of oil and water and by gravity therein accomplishing a separation of sludge, water and inorganic solids, withdrawing befouled oil from the latter, for disposal as oil sludge; and, discharging accumulations of water and inorganic solids, for separate disposal.

3. A portable unit for use in purifying water comprising a tank having end and $xx$ side members and members forming a V bottom, the end and side members respectively being in parallel planes, longitudinally spaced entrance and exit ports in said side members and crossbars joining the upper edges of said side members.

4. A portable unit for use in purifying water comprising a tank having end and $xx$ side members and members forming a V bottom, the end and side members respectively being in parallel planes, longitudinally spaced entrance and exit ports in said side members, cross bars joining the upper edges of said side members, and means positioned in said unit for compelling an initial downward movement of water entering said unit.

5. The structure as claimed in claim 3 and having in addition a baffle depending from said cross bars, means spacing the lower edge of said baffle from said sides at points between said ports, and, means warping and holding the lower edge of the baffle toward said side at points beneath said ports.

6. In a system of the type described, a tank provided with an inlet and on outlet arranged for cross flow of liquid therein, a hanger and a colloid baffle disposed longitudinally in said tank, said baffle comprising a plurality of blade members pivotally secured to said hanger.

7. The improvement as claimed in claim 6 and having in addition means for moving the baffle up and down.

8. In a system for use in purifying water from and for communities and industries, a water channel defined by means forming sides and a bottom, means transversely dividing said channel into divisions arranged at different vertical levels, means for transferring water from a lower to a higher division of said channel, said means being adapted to spray the water from the lower division into the air above the higher division, a motor for actuating said water transfer means, and means for by-passing water from the lower division to a level below that of the upper division.

9. The improvement as claimed in claim 8 and having in addition a sedimentation tank for the reception of the water from the last of said divisions.

10. A sedimentation tank containing a body of liquid and adapted to receive falling spray, in combination with means above the surface of the liquid in the tank for directing the spray thereinto, a baffle positioned wholly within the liquid in the tank and adapted to cause the entering liquid to move horizontally along the surface and release scum, before sinking into the tank, and means for discharging top and bottom sludges from said tank.

11. A sludge tank having means for maintaining a fixed water level therein, in combination with an open topped oil sludge receptacle positioned in said tank and rising above the normal water level therein, means for supplying mixed oil and sludge to said tank, means for decanting settled oil from the upper part of said sludge tank and settled oil sludge from the bottom of said receptacle, and, means for discharging inorganic solids from the bottom of said sludge tank.

12. In a system for purifying sewage means for spraying sewage into the air and means located at a level above the spraying means to receive the falling spray, said last named means comprising inclined elements down which the falling spray cascades, said inclined elements being provided with openings for the admission of air.

13. A skimming trough comprising side and end walls and a bottom, one of said side walls being vertically corrugated to permit the accumulation of scum, and being provided with a plurality of slots adjacent the upper edge thereof.

CHARLES GILBERT HAWLEY.